(12) United States Patent
Matsuura et al.

(10) Patent No.: US 6,920,949 B2
(45) Date of Patent: Jul. 26, 2005

(54) COOLING AIR SYSTEM FOR SMALL VEHICLE

(75) Inventors: Tatsuya Matsuura, Shizuoka (JP); Takashi Isoda, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 10/217,200

(22) Filed: Aug. 9, 2002

(65) Prior Publication Data

US 2003/0029656 A1 Feb. 13, 2003

(30) Foreign Application Priority Data

Aug. 10, 2001 (JP) ........................................ 2001-243127

(51) Int. Cl.[7] .............................................. B60K 11/00
(52) U.S. Cl. ................... 180/68.2; 180/908; 188/264 A
(58) Field of Search .............................. 180/68.1, 68.2, 180/908, 229; 123/41.56, 41.62; 293/117; 188/264 A, 164 AA

(56) References Cited

U.S. PATENT DOCUMENTS

| | | | |
|---|---|---|---|
| 4,319,657 A | 3/1982 | Nomura | |
| 4,321,978 A | 3/1982 | Tominaga et al. | |
| 4,434,755 A | 3/1984 | Kazuta et al. | |
| 4,483,686 A | 11/1984 | Kobayashi et al. | |
| 4,496,019 A * | 1/1985 | Tanaka ....................... | 180/215 |
| 4,531,606 A | 7/1985 | Watanabe | |
| 4,534,440 A * | 8/1985 | Sekizaki et al. ............ | 180/215 |
| 4,593,656 A | 6/1986 | Shibata et al. | |
| 4,667,760 A * | 5/1987 | Takimoto ..................... | 180/215 |
| 4,697,665 A * | 10/1987 | Eastman et al. ............ | 180/230 |
| 4,723,617 A | 2/1988 | Kitada | |
| 4,742,884 A * | 5/1988 | Ishikawa ..................... | 180/219 |
| 4,744,432 A * | 5/1988 | Shibata et al. ............. | 180/68.1 |
| 4,772,299 A * | 9/1988 | Bogusz ....................... | 55/385.3 |
| 4,805,747 A * | 2/1989 | Moedinger et al. ..... | 188/264 A |
| 4,821,685 A | 4/1989 | Matsushima et al. | |
| 4,836,324 A * | 6/1989 | Morita et al. ................ | 180/291 |
| 4,848,294 A | 7/1989 | Yamamoto | |
| 4,878,555 A * | 11/1989 | Yasunaga et al. .......... | 180/68.3 |
| 5,016,725 A | 5/1991 | Muramatsu | |
| 5,152,365 A | 10/1992 | Aoshima | |
| 5,174,258 A | 12/1992 | Tanaka | |
| 5,176,111 A | 1/1993 | Nakamura et al. | |
| 5,205,244 A | 4/1993 | Nakamura et al. | |
| 5,577,570 A | 11/1996 | Shiohara et al. | |
| 5,657,628 A | 8/1997 | Takeuchi | |
| 5,692,578 A * | 12/1997 | Miyakawa et al. ........ | 180/68.3 |
| 5,976,044 A | 11/1999 | Kuyama | |
| 6,073,731 A * | 6/2000 | Ieda .......................... | 188/71.5 |
| 6,086,492 A | 7/2000 | Nakano et al. | |
| 6,170,597 B1 | 1/2001 | Fukuda | |
| 6,315,091 B1 * | 11/2001 | Nilsen et al. ............ | 188/264 A |
| 6,537,338 B2 * | 3/2003 | Inoue et al. ................ | 55/385.3 |
| 6,622,806 B1 * | 9/2003 | Matsuura ................... | 180/68.1 |
| 6,705,417 B2 * | 3/2004 | Kitai et al. ................ | 180/68.1 |

FOREIGN PATENT DOCUMENTS

| | | |
|---|---|---|
| JP | 10-110813 | 4/1998 |
| JP | 11-149622 | 7/2000 |

OTHER PUBLICATIONS

Co-pending patent application: Serial No. 09/553,652, filed Apr. 21, 2000, entitled Air Inlet for ATV, in the name of Tatsuya Matsuura, and assigned to Yamaha Hatsudoki Kabushiki Kaisha.

* cited by examiner

*Primary Examiner*—Christopher P. Ellis
*Assistant Examiner*—Brian Swenson
(74) *Attorney, Agent, or Firm*—Knobbe, Martens, Olson & Bear, LLP

(57) ABSTRACT

A small vehicle has a frame assembly that is supported by rear wheels. An engine is supported by the frame assembly. The rear wheels are driven by the engine through a shaft drive arrangement. A brake assembly is connected to the shaft drive arrangement. An exhaust system extends away from the engine. An air cleaner is positioned along an air induction system of the engine. The air cleaner is positioned between the exhaust system and a cooling air duct that supplies cooling air to the brake assembly.

28 Claims, 21 Drawing Sheets

COOLING AIR SYSTEM FOR SMALL VEHICLE

PRIORITY INFORMATION

This application is based on and claims priority to Japanese Patent Application No. 2001-243127, filed Aug. 10, 2001, the entire contents of which is hereby expressly incorporated by reference.

BACKGROUND OF THE INVENTION

1. Field of the Invention

The present invention generally relates to cooling air supply systems of small vehicles. More particularly, the present invention relates to brake system cooling arrangements for small vehicles, such as an all terrain vehicles, for example.

2. Description of the Related Art

Small all terrain vehicles generally feature a frame assembly that supports a fuel tank and a seat. An engine is generally positioned within an engine compartment defined by the frame assembly and is located generally beneath the seat and/or fuel tank. In conventional small all terrain vehicles, the frame assembly is supported by at least one front wheel and two rear wheels. The wheels are driven by a shaft, belt or chain drive configuration. Depending upon the drive configuration, the vehicle can be driven by two of the wheels or all of the wheels.

A braking system is employed to stop these vehicles. In some arrangements, such as that shown and described in U.S. Pat. No. 4,719,984, the vehicle is provided with a brake disc that is connected to a drive shaft, which is connected to the rear wheels. The brake disc is squeezed between a pair of brake pads that are operated by a brake caliper. The brake disc and the brake pads can be positioned within a housing to protect the brake components from damaging contact (e.g., see Japanese Patent Publication No. Hei 7-37819).

During braking, friction heat is generated by the brake system. In arrangements in which a rear drive shaft carries the brake disc, the engine often is positioned forward of the brake disc. Accordingly, the normal flow of air created over the brake system during vehicle operation generally is reduced or eliminated. Because heat has an adverse effect on brake performance, a cooling system for Such a brake system is desired.

While cooling air has been supplied to a shaft drive brake system in the past, such attempts to cool the brake system have created other problems. For instance, depending upon the construction of the cooling system, heat from the engine or the exhaust system can increase the temperature of the air being supplied to the brake system. If the air is heated in this manner, the cooling efficiency of the cooling system is adversely affected. In addition, depending upon the construction of the cooling system, ducting used in the cooling system can be prone to clogging during operation of the vehicle due to the offroad nature of such operation. If an operator does not regularly check the cooling system for clogging and clear the ducting if necessary, the cooling system will fail to operate properly.

SUMMARY OF THE INVENTION

Thus, a brake cooling system is desired in which the ducting is spaced from heat sources, such as the exhaust system, and in which the operability of the cooling system can be easily checked and maintained.

Accordingly, one aspect of the present invention involves an all terrain vehicle comprising a frame assembly with an engine mounted to the frame assembly. The engine comprises a combustion chamber, an intake system and an exhaust system that communicates with the combustion chamber. The intake system comprises an air cleaner that is generally centrally disposed relative to a width of the vehicle. The exhaust system extends to a first lateral side of the air cleaner. A cooling duct inlet is disposed to a second lateral side of the air cleaner. The inlet forms an opening in a forward end of a cooling duct and the inlet defines a structure that is generally open in a forward direction. The cooling duct also comprises an outlet that is generally open toward an object to be cooled by air flowing through the cooling duct.

Another aspect of the present invention involves an all terrain vehicle comprising a frame assembly with an engine mounted to the frame assembly. The frame assembly is supported by a pair of rear wheels that are driven by the engine through a shaft drive assembly. A brake assembly is coupled to the shaft drive assembly. The brake assembly comprises a brake disc that is coupled to a drive shaft of the shaft drive assembly and a brake caliper. The engine comprises a combustion chamber, an intake system and an exhaust system that communicates with the combustion chamber. The intake system comprises an air cleaner. The air cleaner is generally centrally disposed relative to a width of the vehicle. The exhaust system extends to a first lateral side of the air cleaner and a cooling duct inlet is disposed to a second lateral side of the air cleaner. The inlet forms an opening in a forward end of a cooling duct and the inlet defines a structure that is generally open in a forward direction. The cooling duct also comprises an outlet that is generally opened toward the brake assembly.

A further aspect of the present invention involves an all terrain vehicle comprising a frame assembly that is supported by a pair of rear wheels. An engine is mounted to the frame assembly. The engine drives the rear wheels through a shaft drive assembly. A brake assembly is coupled to the shaft drive assembly. The engine comprises a combustion chamber, an intake system and an exhaust system that communicates with the combustion chamber. The exhaust system comprises an exhaust pipe. A cooling system is provided to direct cooling air flow to the brake assembly. The cooling system comprises a cooling air duct. The duct comprises an inlet that is disposed generally higher than the engine. The vehicle further comprising means for insulating the inlet from the exhaust pipe.

BRIEF DESCRIPTION OF THE DRAWINGS

These and other features, aspects and advantages of the present invention will now be described with reference to the drawings of a preferred embodiment, which is intended to illustrate and is not intended to limit the scope of the present invention. The drawings comprise 21 figures.

showing a heat shield plate disposed below at least a portion of the fuel tank.

Figure 1:
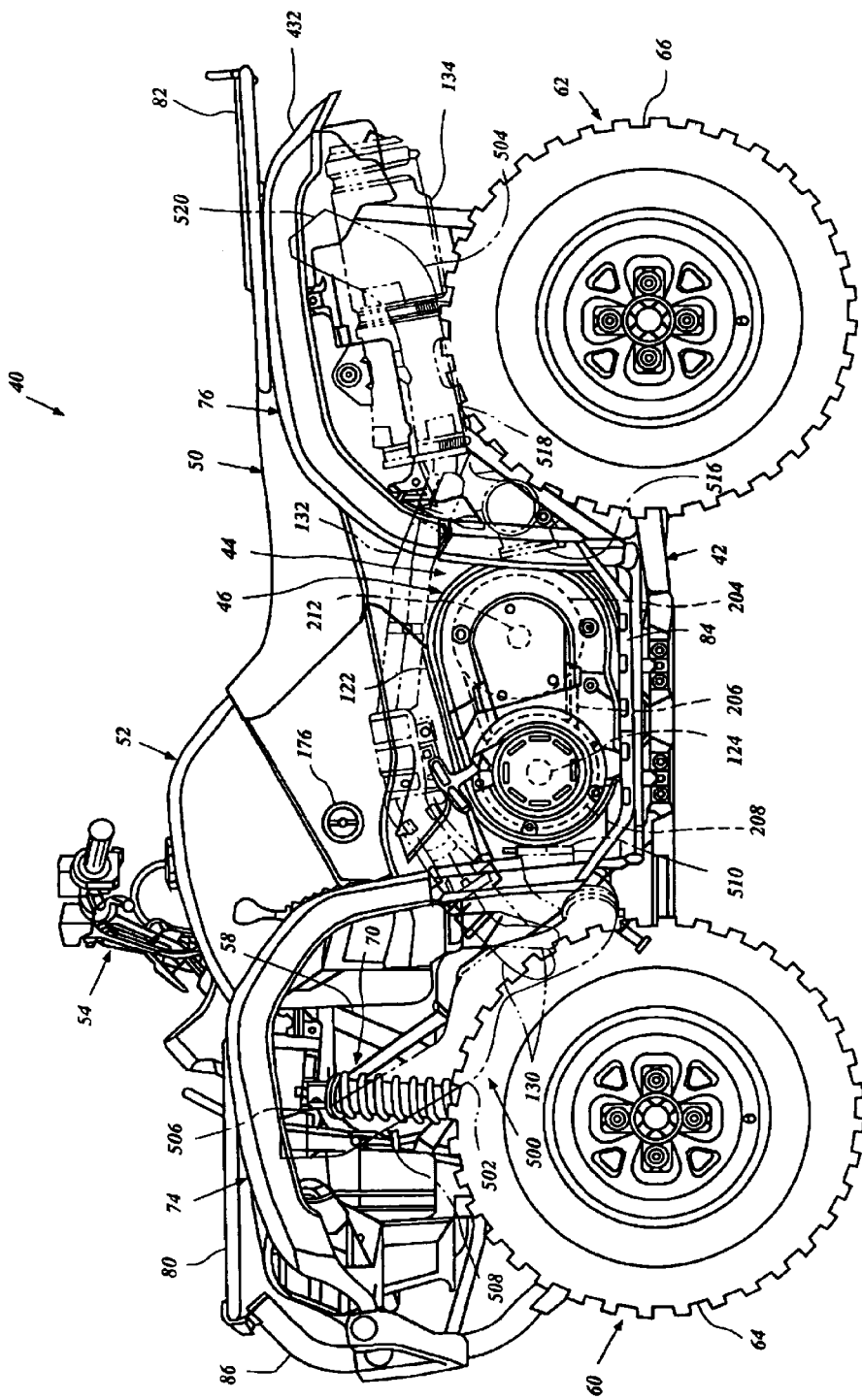
FIG. 1 is a left side elevation view of a small vehicle arranged and configured in accordance with certain features, aspects and advantages of the present invention.
Figure 9:
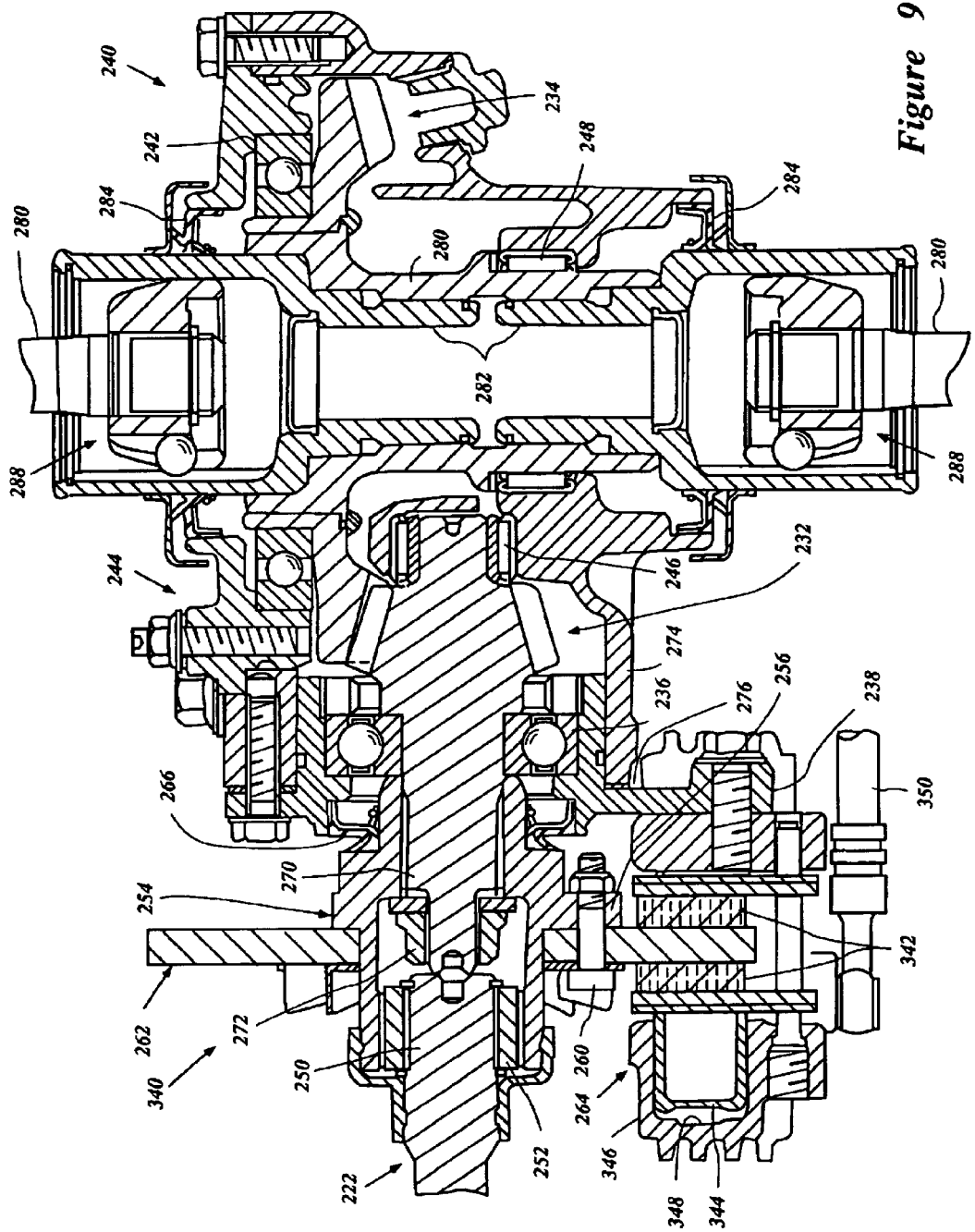

FIG. 9 is a sectional plan view of a brake assembly and bevel gear mechanism associated with a rear wheel drive arrangement employed by the vehicle of FIG. 1.

Figure 10:
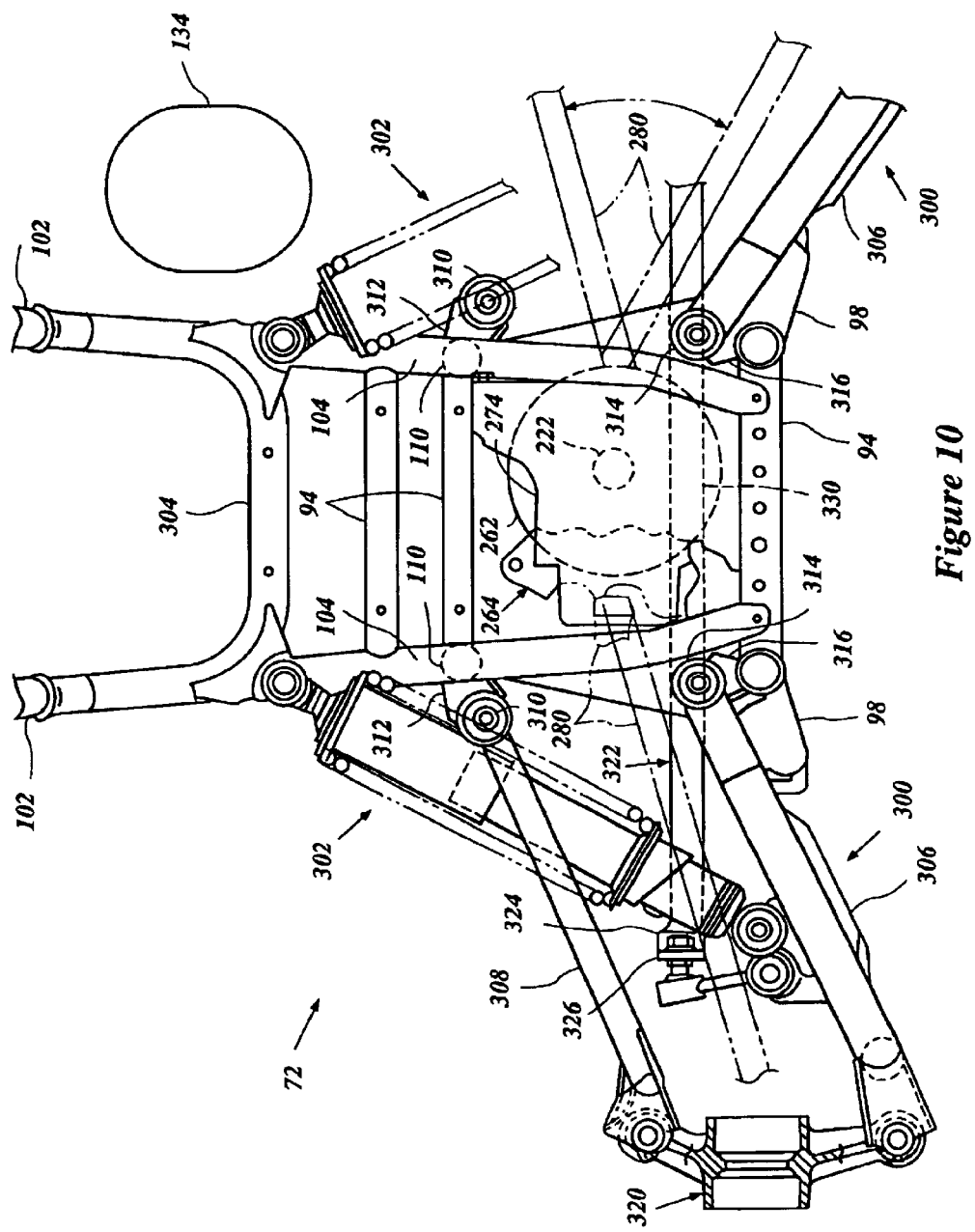

FIG. 10 is a simplified rear view of a rear suspension system used by the vehicle of FIG. 1.

Figure 11:
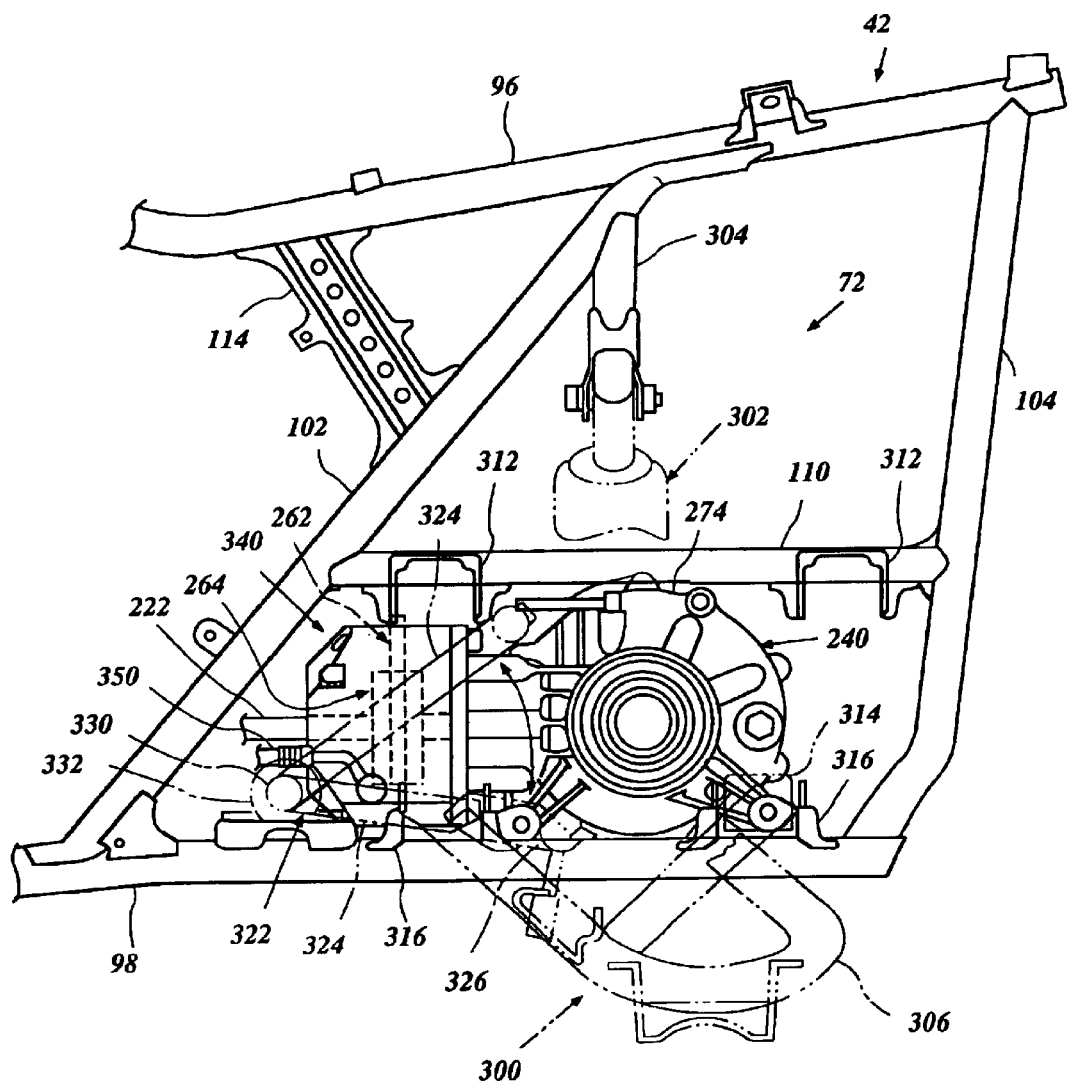

FIG. 11 is a left side elevation view of the rear suspension assembly of FIG. 10.

Figure 12:
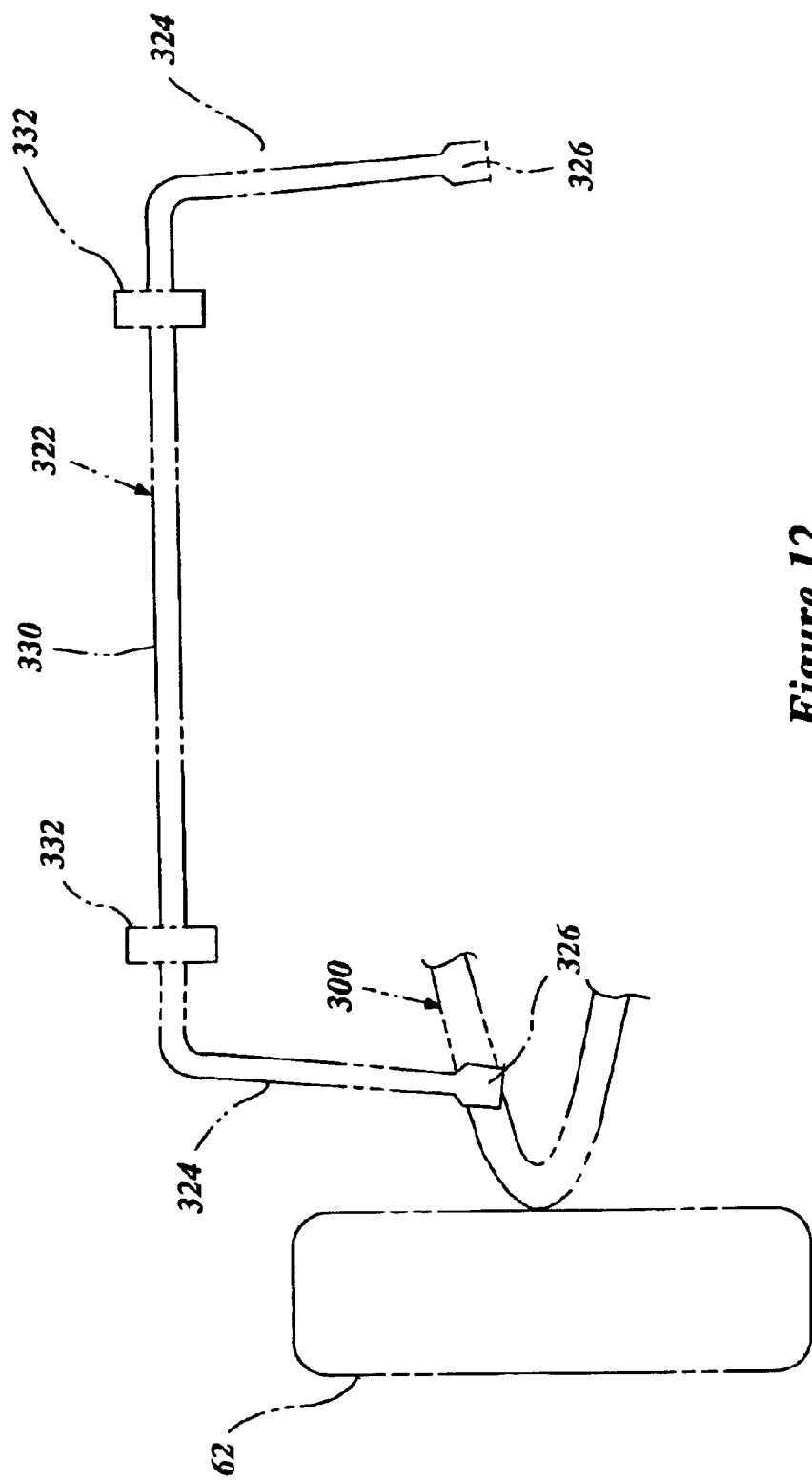

FIG. 12 is a simplified top plan view of a portion of the rear suspension assembly of FIG. 10.

Figure 13:
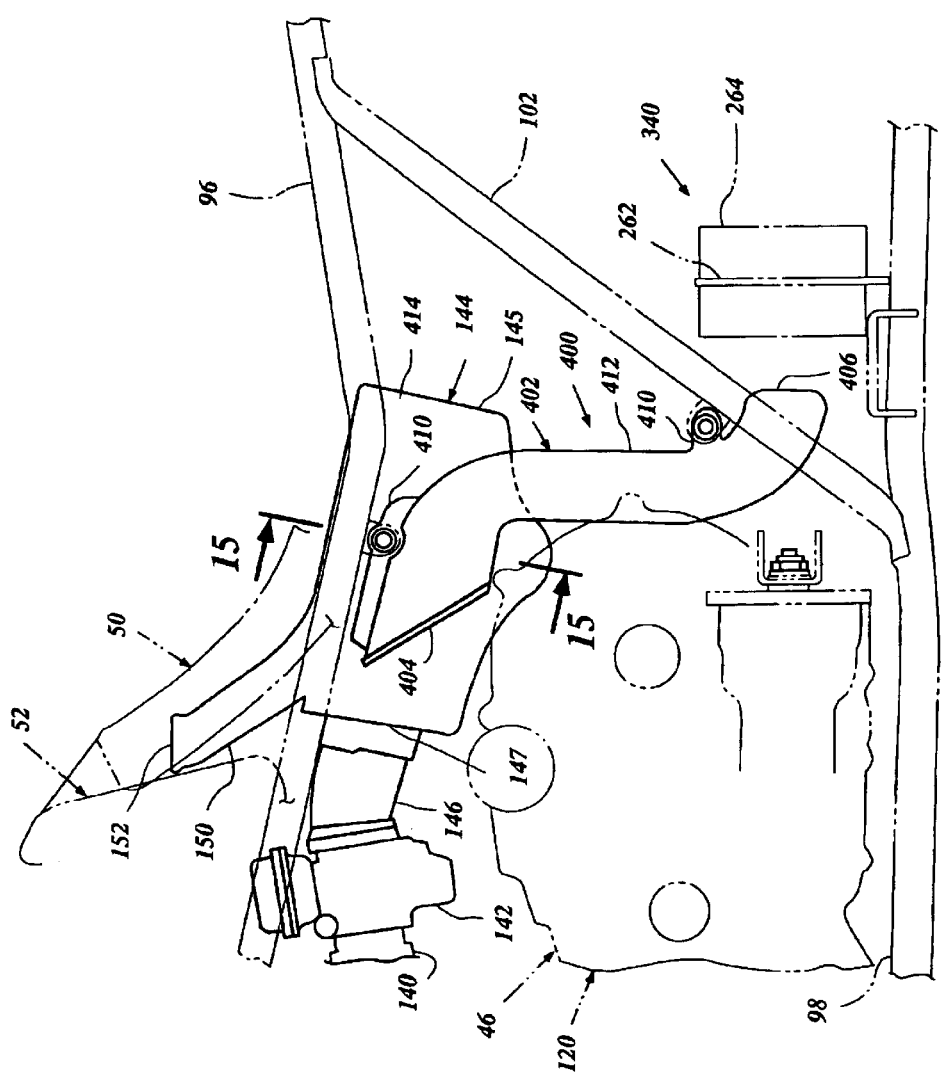

FIG. 13 is a left side elevation view of an air box and brake cooling assembly.

Figure 14:
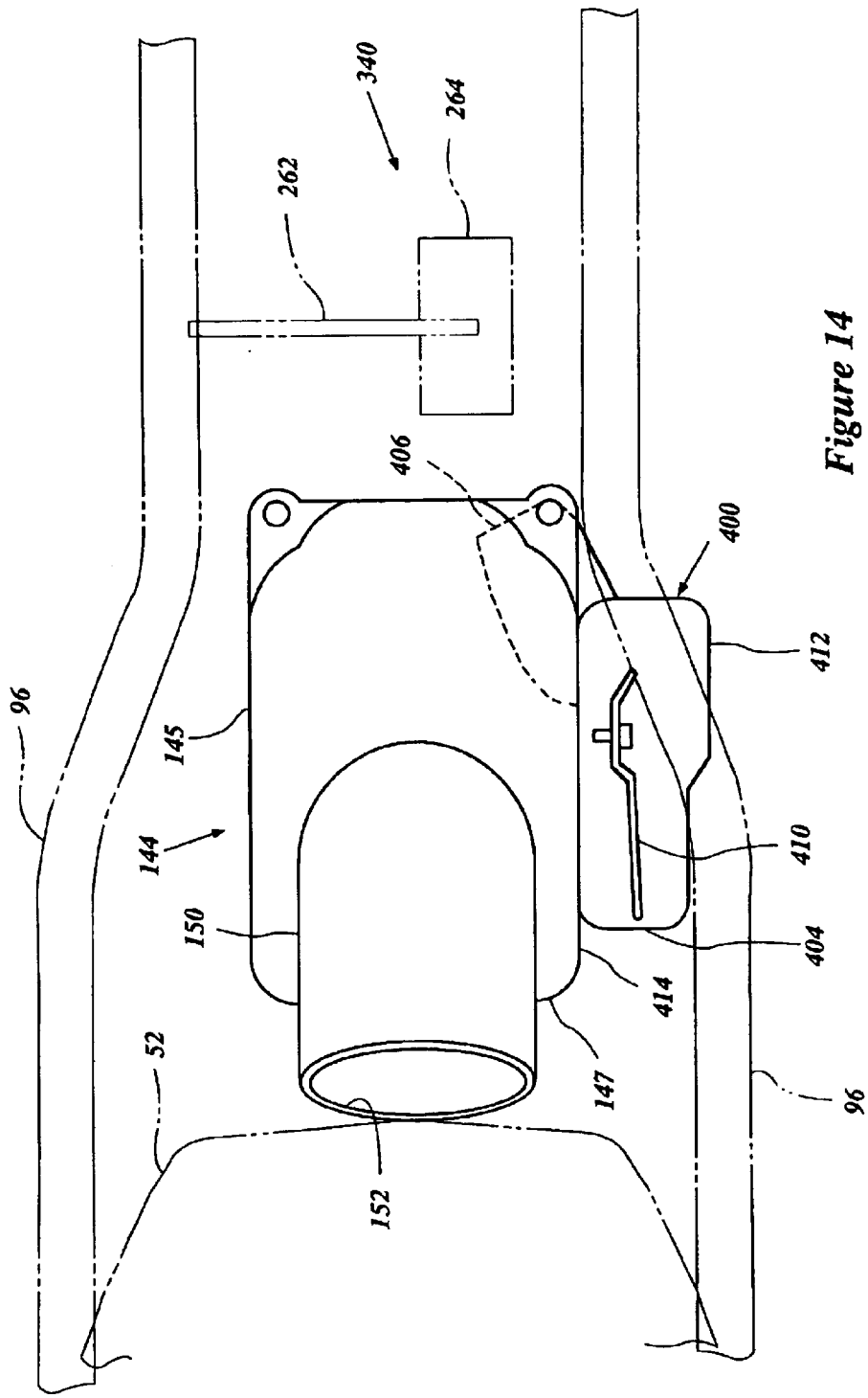

FIG. 14 is a top plan view of the air box and brake cooling assembly of FIG. 13.

Figure 15:
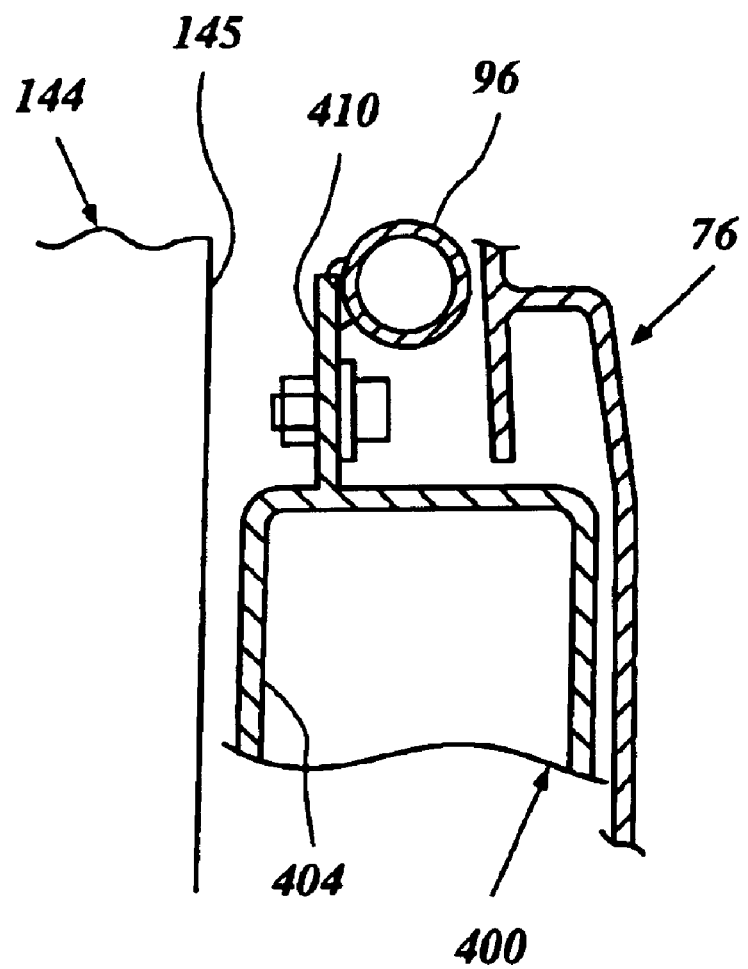

FIG. 15 is a sectioned front elevation view of a cooling air induction duct taken along the line 15—15 in FIG. 13.

Figure 16:
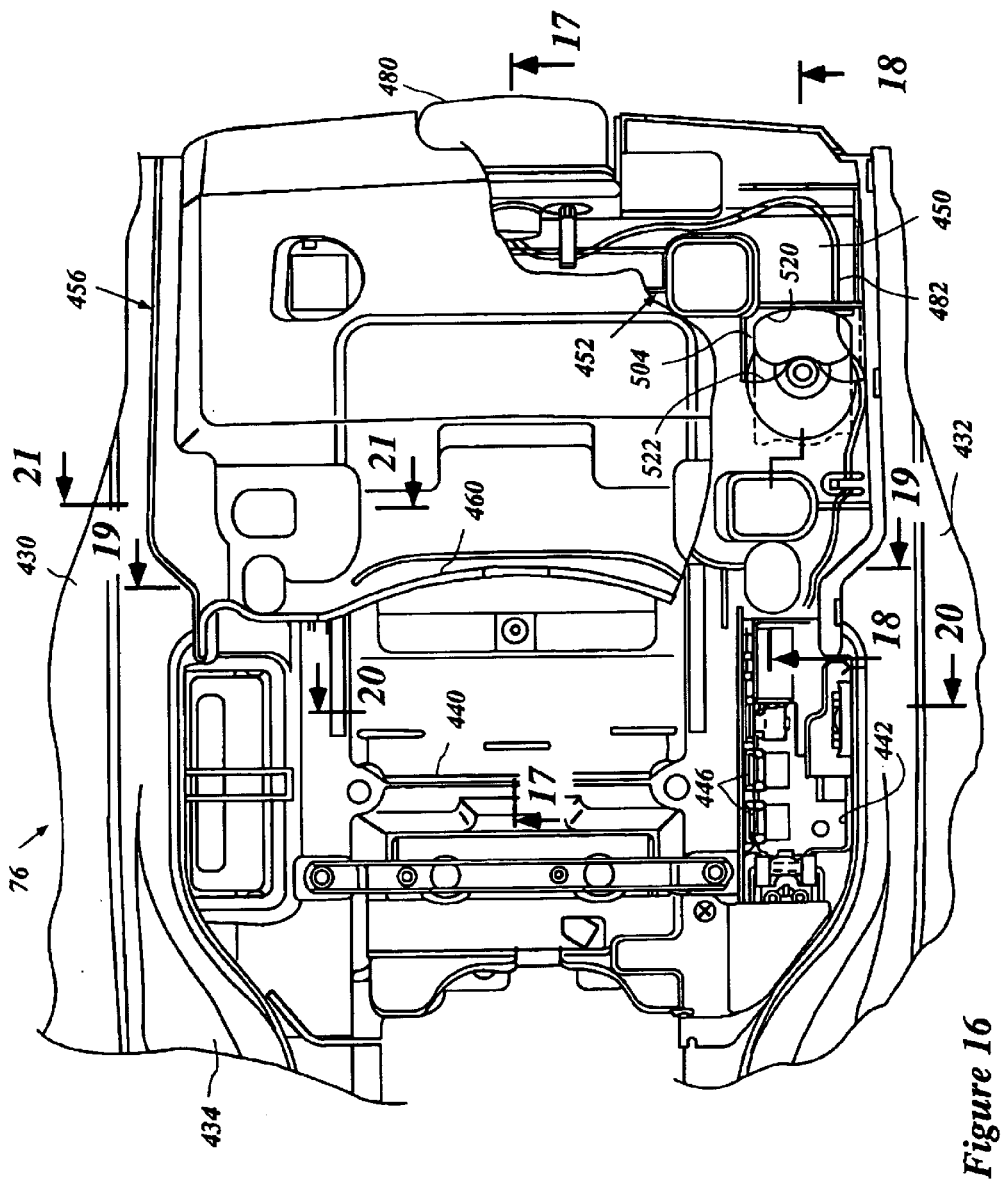

FIG. 16 is a top plan view of a rear fender assembly.

FIGS. 17–21 are sectioned views of the rear fender assembly taken along the corresponding lines in FIG. 16.

DETAILED DESCRIPTION OF THE PREFERRED EMBODIMENT

With reference now to FIG. 1, a small all terrain vehicle 40 that is arranged and configured in accordance with certain features, aspects and advantages of the present invention is shown. The vehicle comprises a frame assembly 42. The frame assembly 42 can have any suitable construction.

In the illustrated arrangement, the frame assembly 42 comprises a double cradle construction, in which the frame assembly 42 defines an engine compartment 44. An engine unit 46 is positioned within the engine compartment 44. The engine unit 46 preferably is centrally positioned within the frame assembly 42.

As is conventional in the design of smaller all terrain vehicles, a seat 50 is positioned generally above the engine unit 46. Generally, the seat 50 is a saddle-type seat, which allows an operator to sit on the seat 50 with a leg disposed to each lateral side of the seat. In some arrangements, however, the seat 50 can be configured to allow an operator to have his or her legs and feet positioned forward of the seat 50.

Figure 5:
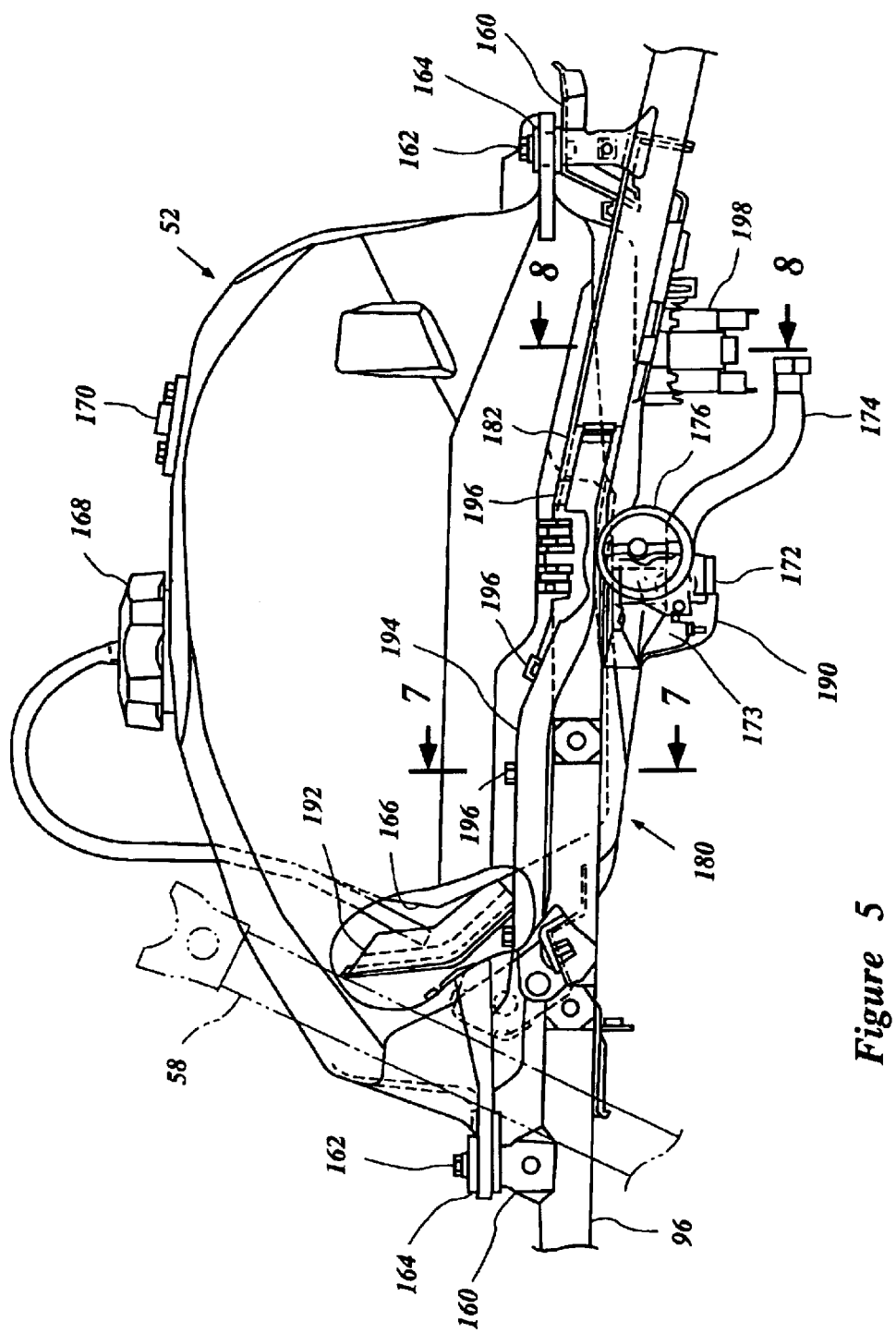
FIG. 5 is a partial left side elevation view of the fuel tank and frame assembly of the vehicle of FIG. 1.

Forward of the seat 50, a fuel tank 52 is mounted to the frame assembly 42 in a manner that will be described in further detail below. A steering handle assembly 54 extends upward at a location forward of the fuel tank 52. The steering handle assembly 54 preferably comprises a handle bar 56 that is connected to a steering column 58 (see FIGS. 1 and 5). The steering column is operatively connected to at least one front wheel 60. Through the connection, the steering column 58 is turned by pivotal movement of the steering handle assembly 54, which imparts a steering movement to the front wheel or wheels 60.

As illustrated, the frame assembly 22 preferably is supported by the front wheels 60 and a pair of rear wheels 62. In the illustrated arrangement, the front wheels 60 each comprise a low pressure, wide balloon tire 64 while the rear wheels 62 each comprise a similar low pressure, wide balloon tire 66.

The front wheels 60 preferably are connected to the frame assembly 42 through suitable suspension components, such a front shock absorbers 70. The illustrated shock absorbers 70 extend between an upper portion of the frame assembly 42 and an A-arm (not shown) or the like. Other suitable front suspension systems also can be used. The rear wheels 62 also preferably are connected to the frame assembly 42 through a suitable rear suspension arrangement 72 (see FIG. 10), which will be described in greater detail below.

The vehicle 40 also comprises a front fender assembly 74 and a rear fender assembly 76. The fender assemblies 74, 76 are provided to cover the upper parts of the front wheels 60 and the rear wheels 62. The fender assemblies 74, 76 can be connected to the frame assembly 42 in any suitable manner. Generally, the fender assemblies 74, 76 preferably are connected to the frame assembly 42 through the use of threaded fasteners or the like.

A front rack assembly 80 and a rear rack assembly 82 preferably are positioned over the front fender assembly 74 and the rear fender assembly 76, respectively. The rack assemblies 80, 82 enhance the load carrying capabilities of the vehicle 40. In the illustrated arrangement, the rack assemblies 80, 82 extend over at least a portion of the front wheels 60 and the rear wheels 62, respectively, in top plan view.

A pair of foot boards 84 are supported by the frame assembly 22. The foot boards 84 preferably are disposed to the sides of the engine compartment 44. Each of the foot boards 84 desirably supports one foot of a rider when the rider is positioned on or over the seat 50.

With reference to FIG. 1, a bumper 86 preferably is disposed on a front end of the frame assembly 22. The bumper 86 can be formed integrally with the frame assembly 22 or can be connected to the frame assembly 22 in any suitable manner. The bumper 86 preferably wraps upward and rearward and can surround headlights or the like.

Figure 3:
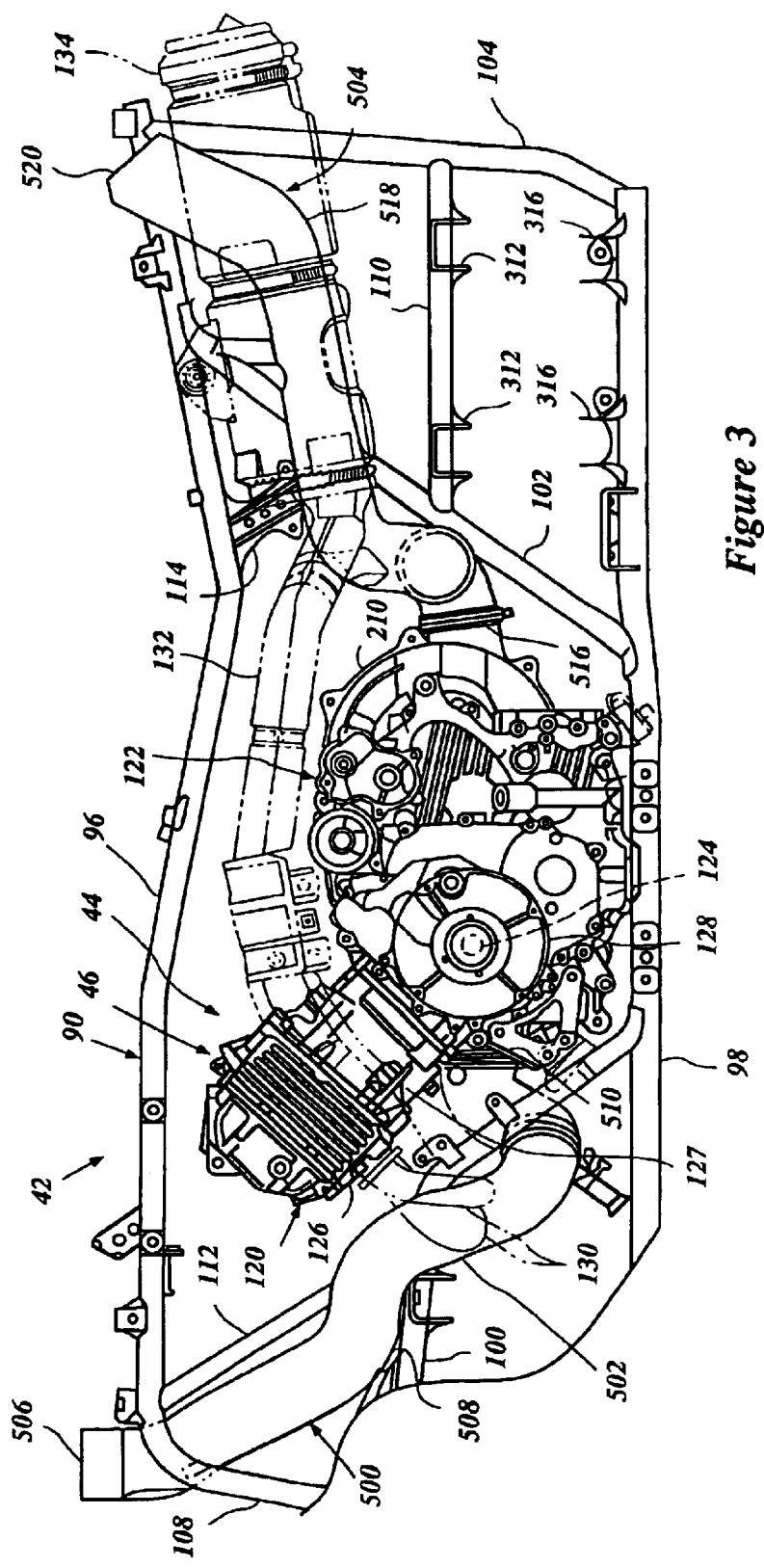
FIG. 3 is a partial left side elevation view of a frame assembly and engine of the vehicle of FIG. 1.
Figure 4:
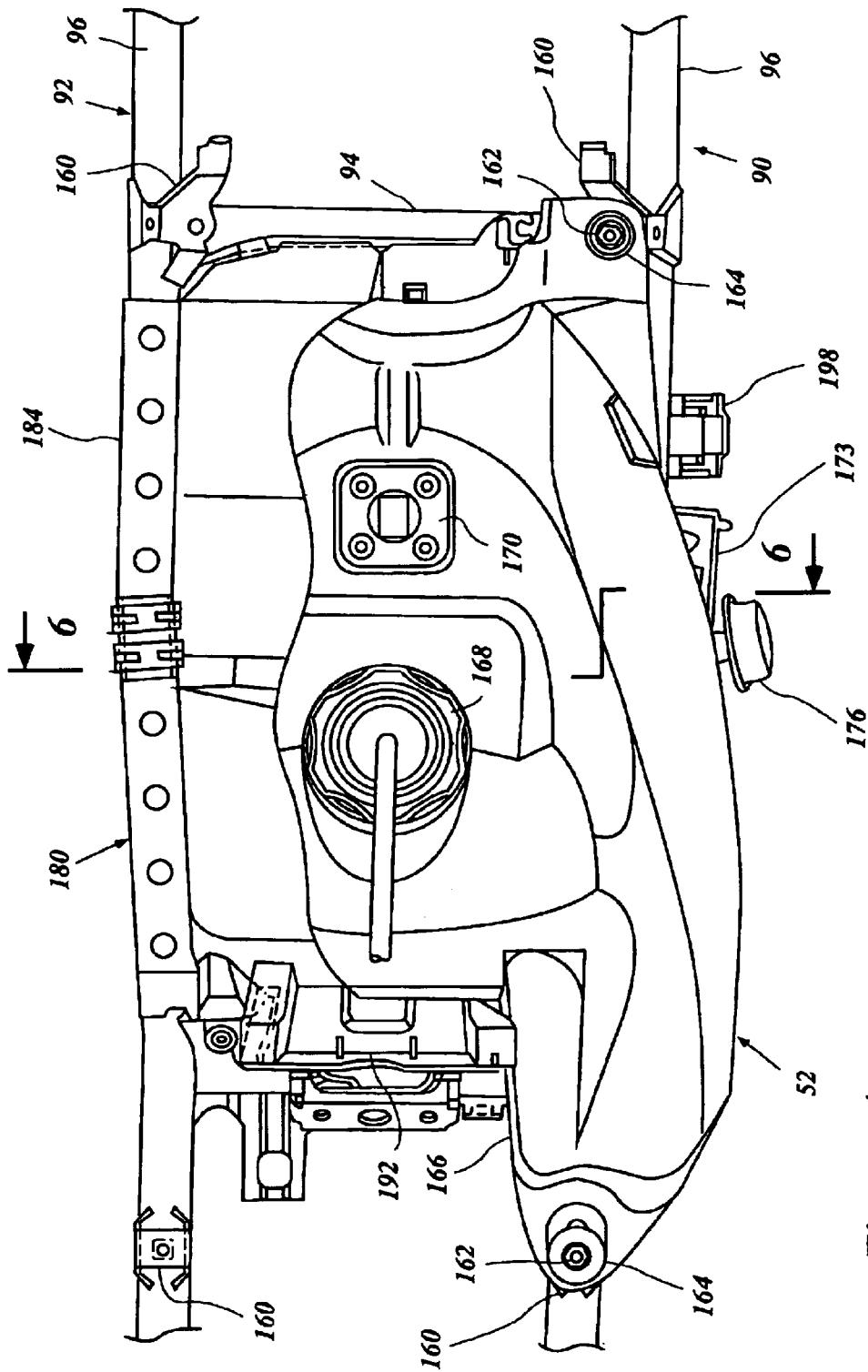
FIG. 4 is a partially broken out top plan view of a fuel tank and frame assembly of the vehicle of FIG. 1.

With reference now to FIGS. 3 and 4, the frame assembly 42 preferably comprises a left side frame 90 and a right side frame 92, which are connected with a number of cross members 94, which generally extend laterally between the left side frame 90 and the right side frame 92. As such, the illustrated frame assembly generally is considered a double cradle type.

Each side frame 90, 92 preferably comprises an upper pipe 96 and a lower pipe 98, which extend in a longitudinal direction of the vehicle. In the illustrated frame assembly 42, the upper pipe 96 and the lower pipe 98 are connected with a front pipe 100, an intermediate pipe 102, and a rear pipe 104. Preferably, a forward portion 108 of the upper pipe 96 bends downward. The forward portion 108 desirably is connected with a forward portion of the lower pipe 98.

With continued reference to FIG. 3, a longitudinally extending support pipe 110 generally extends in parallel with the lower pipe 98. The support pipe 110 preferably is connected to the intermediate pipe 102 and the rear pipe 104. The support pipe 110 can be formed in any desired shape or configuration. As will be described below, the support pipe 110 provides a mounting location for certain components of the rear suspension system 72.

As illustrated, a gusset pipe 112 preferably reinforces a forward portion of each side frame 90, 92. In the illustrated arrangement, the gusset pipe 112 extends between the upper pipe 96 and the front pipe 102. For additional reinforcement, a reinforcing bracket 114 (see FIGS. 3 and 11) can extend between the upper pipe 96 and the intermediate pipe 102.

With reference now to FIG. 3, the engine unit 46 preferably comprises a water cooled, four cycle, inline two cylinder engine 120 and a continuously variable transmission (CVT) 122. In one arrangement, the CVT 122 is connected to the right side of the engine 120 in the vehicle width direction. Other arrangements can also be used. Preferably, the engine 120 is mounted such that a crankshaft 124 of the engine 120 extends in a lateral direction. More preferably, the engine 120 is mounted such that an axis of the cylinders of the engine is forwardly inclined, such that the overall height of the engine 120 can be decreased. The above engine 20 is mounted as the crankshaft 22 is placed horizontally to the vehicle width direction, and the cylinder axis is inclined forward.

The engine 120 generally comprises a cylinder head 126 that is connected to a crank case 128 through cylinder block 127. A cylinder bore (not shown) is defined within the cylinder block 127. A piston (not shown) reciprocates within the cylinder bore (not shown) and, together with a recess (not shown) in the cylinder head 126 and the cylinder bore (not shown), defines a variable volume combustion chamber (not shown).

An exhaust port extends outward from the combustion chamber and exhaust pipes 130 for each cylinder are connected to a front wall of the illustrated cylinder head 126 such that the exhaust pipes 130 are in fluid communication with the exhaust port. In the illustrated arrangement, these exhaust pipes 130 extend forward from the engine 120 and then wrap rearward along the right side of the cylinder head 126. The exhaust pipes 130 also merge into a common converging pipe 132. The illustrated converging pipe 132 extends rearward from the right side of the cylinder head 126 to an exhaust silencer 134, which is in fluid communication with the converging pipe 132. The exhaust silencer 134 preferably is positioned to the outside of the right upper pipe 96.

An intake port (not shown) also is defined to extend from the combustion chamber (not shown). An intake pipe 140 (see FIG. 13) preferably is in fluid communication with the intake port (not shown). The intake pipe 140 receives a flow of air from a common carburetor 142. In such an arrangement, a separate intake pipes 140 preferably extends from the common carburetor 142 to the each cylinder. In one arrangement, each intake pipe 140 can communicate with a separate carburetor.

An air cleaner 144 preferably is connected to the carburetor 142 through an air intake duct 146. The air cleaner 144 preferably is disposed rearward of the cylinder head 126 between the right and left upper pipes 96 and generally beneath the seat 50.

With reference now to FIG. 13, the illustrated air cleaner 144 generally comprises a main air box 145, which is substantially sealed. The main air box 145 in the illustrated arrangement is generally rectangular and the air intake duct 146 desirably is connected to a front wall 147 of the air box 145. An air inlet duct 150 preferably extends upward and forward of the air box 145 and allows air to be drawn into the air box 145. Preferably, the positioning of the inlet into the air box 145 from the air inlet duct 150 and the positioning of the outlet from the air box 145 into the air intake duct are spaced and directed to require a change of airflow direction within the air box 145. Such an arrangement helps separate foreign matter from the airflow prior to induction into the engine 120.

Desirably, the air inlet duct 150 comprises an opening 152 that is disposed in a generally protected air pocket. In the illustrated arrangement, the opening 152 is disposed in an air pocket positioned between a portion of the seat 50 and a portion of the fuel tank 52. More particularly, the illustrated air inlet duct 150 extends obliquely upward and forward from a forward portion of the top wall of the air box 145 and the opening 152 of the duct 150 is opens in an upward-facing direction between a rear wall of the fuel tank 52 and a forward wall of the seat 52. Through this placement, the opening can be substantially protected from splashing water, mud, dirt or the like.

Within a chamber defined by the air box 145, the illustrated arrangement desirably contains a filter element (not shown). The filter element (not shown) can have any suitable construction. Preferably, the filter element (not shown) extends across an airflow from the opening 152 and the air intake duct 146. The filter element (not shown), thus, can remove particulate matter and the like from the air being supplied to the engine 120. The filter element (not shown) preferably is positioned within the air box 145 to facilitate replacement of the filter element (not shown); nevertheless, the filter element (not shown) can be positioned within a duct, if desired.

With reference now to FIGS. 4 through 8, the fuel tank 52 is disposed generally above the engine 120. In the illustrated arrangement, the fuel tank 52 is connected to the frame assembly 22 using brackets 160. Preferably, the brackets 160 are mounted to the right and left upper pipes 96 and the fuel tank 52 can be secured to the brackets with bolts 162 that extend through grommets 164. Other mounting arrangements, such as using mechanical interlocking structures and the like, also can be used to secure the fuel tank 52 to the frame assembly 42.

With continued reference to FIG. 4, a recess 166 advantageously is provided in a forward portion of the illustrated fuel tank 52. Due to this construction, the steering shaft 58 of the steering handle assembly 54 can extend through the recess and a more compact construction results.

It should be mentioned that a cap 168 can be provided for opening and closing a fuel filler port (not shown). In addition, a fuel meter 170 preferably is provided on a surface of the fuel tank to indicate the amount of fuel contained within the fuel tank 52. As these constructions are generally known, any suitable configuration of the fuel cap 168 and the fuel meter 170 can be used. In some arrangements, the two may be integrated while, in other arrangements, the fuel meter may be eliminated.

A fuel cock 172 can be connected to a lower portion of the fuel tank 52. In the illustrated arrangement, the fuel cock 172 is mounted to a bottom surface of the fuel tank, preferably proximate a lowermost portion 173 of the fuel tank 52. The fuel cock 172 preferably is connected to the carburetor 142 through a fuel line 174. The fuel cock 172 can be used to open and close the flow of fuel through the fuel line 174. As such, a lever 176 is provided that operates a valve member (not shown) that is positioned within the fuel cock 172. The lever 176 preferably is positioned for easy manipulation with a rider positioned on the seat 50.

Figure 6:
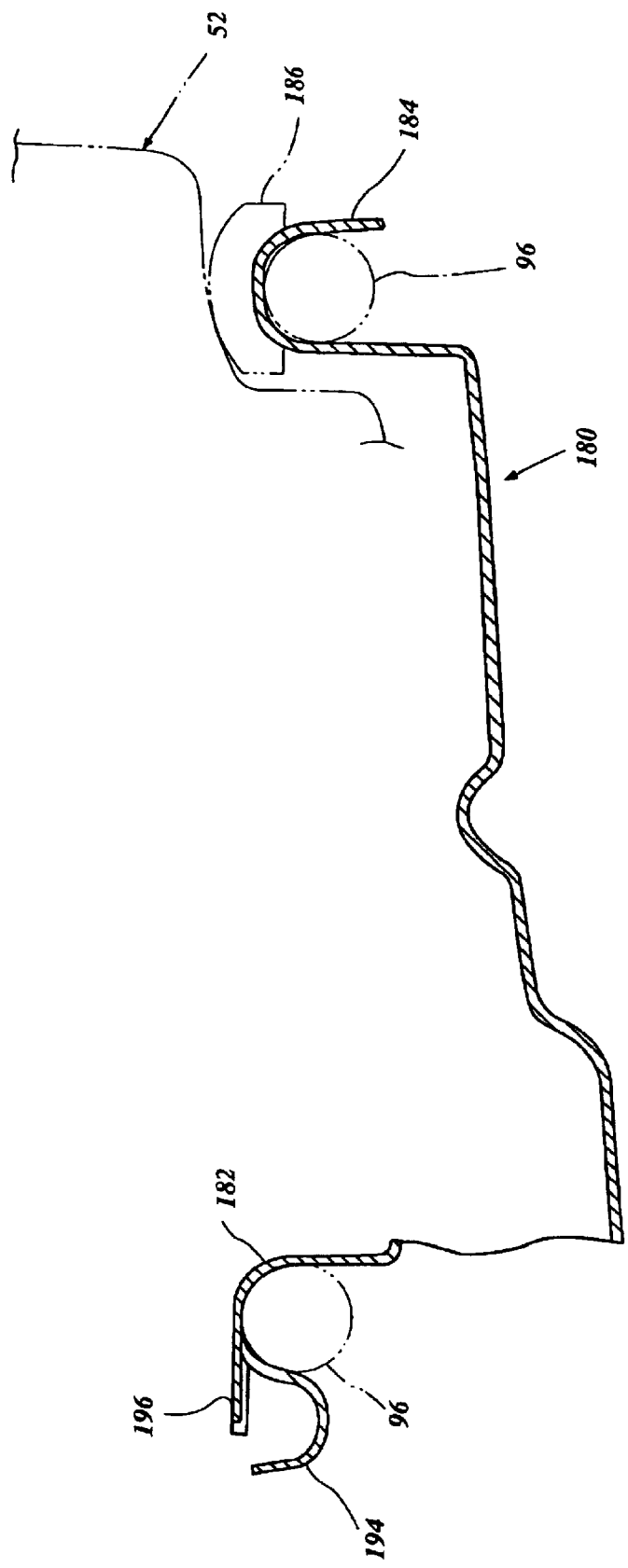
FIGS. 6, 7 and 8 are respective sectional views taken along lines 6—6 (FIG. 4), 7—7 (FIG. 5) and 8—8 (FIG. 5)
Figure 7:
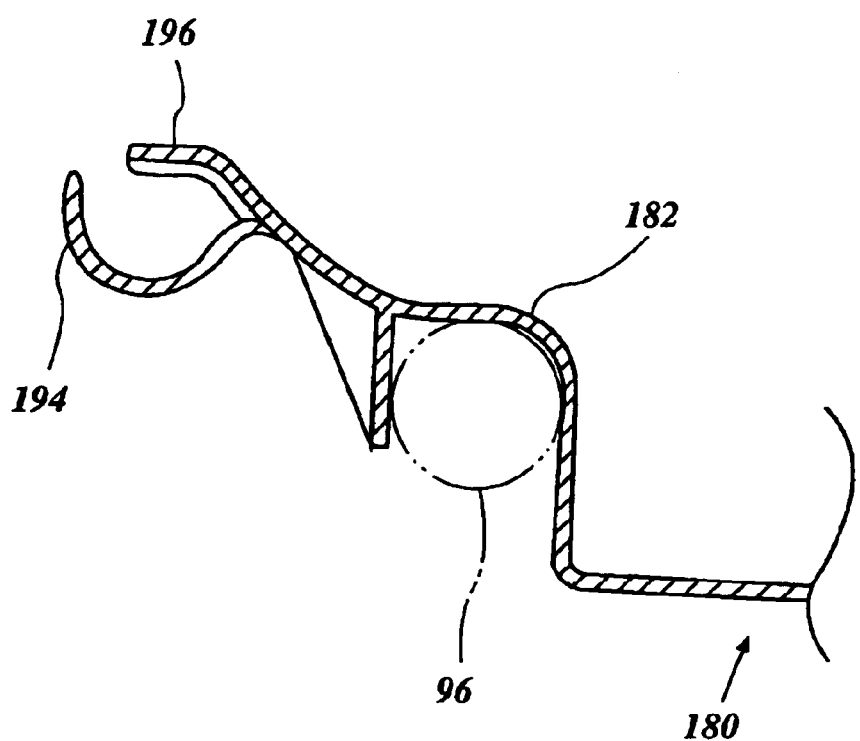

With reference to FIGS. 4 and 6, a heat shield 180 preferably is disposed beneath at least a portion of the fuel tank 52. More preferably, the heat shield 180 is sized to cover almost the entire bottom surface of the fuel tank 52. In one arrangement, the heat shield 180 is formed as a plate made of a resin-based material. The heat shield 180 preferably is designed to reduce the level of, or to prevent, heat conduction into the fuel tank 52.

To help secure the heat shield 180 in position relative to the frame assembly 42, the illustrated heat shield 180 comprises two flanges 182, 184 that are formed along the right and left edges of the heat shield 180. The flanges 182, 184 of the illustrated heat shield 180 are supported on the frame assembly 42 such that the right and left flanges are supported on the upper pipes 96 of the frame assembly 42.

Thus, the heat shield 180 can be secured in the illustrated arrangement without special brackets, which advantageously reduces the number of components required when assembling the vehicle 40. In one arrangement, a rubber member 186 can be positioned between the fuel tank 52 and the upper pipes 96. In such an arrangement, the rubber member 186 preferably directly abuts the fuel tank 52. The rubber member 186 can reduce the transfer of vibrations from the frame assembly 42 to the fuel tank 52.

An extension 190 of the heat shield 180 preferably bulges proximate the fuel cock 172. Thus, the fuel cock 172 can be substantially encased by the heat shield 180. In one arrangement, the extension 190 is integrally formed with the heat shield 180. In another arrangement, the extension 190 is a separate component from the heat shield.

Preferably, a damper 192 also extends upward and forward within the recess 166. In a presently preferred arrangement, the damper 192 forms a portion of the heat shield 180 that is bent upward and that carries a rubber bumper member.

A wiring recess 194 preferably extends along at least a portion of the heat shield 180. The wiring recess 194 in the illustrated arrangement is upwardly opening and is continuously formed adjacent the left flange 182. A lead wire (not shown) can be positioned within the wiring recess 194. A plurality of clamp pieces 196 also can be provided to secure the lead wire (not shown). The clamp pieces 196 can be formed in or attached to the upper edge of the wiring recess 194. Accordingly, separate clamps do not need to be used with the illustrated arrangement.

The illustrated heat shield 180 also extends almost coextensively with the fuel tank 52. In this manner, the heat shield 180, which is plate-like in the illustrated arrangement, covers the engine compartment that is defined generally below the fuel tank 52 in the illustrated arrangement. Thus, the heat shield 180 can cover the engine and water, such as rain water, that may drip down the sides of the fuel tank 52, is caught by the heat shield 180 and redirected to a location generally away from the engine. Such a construction reduces the amount of rain water that may drip onto the engine from the fuel tank region.

Figure 8:
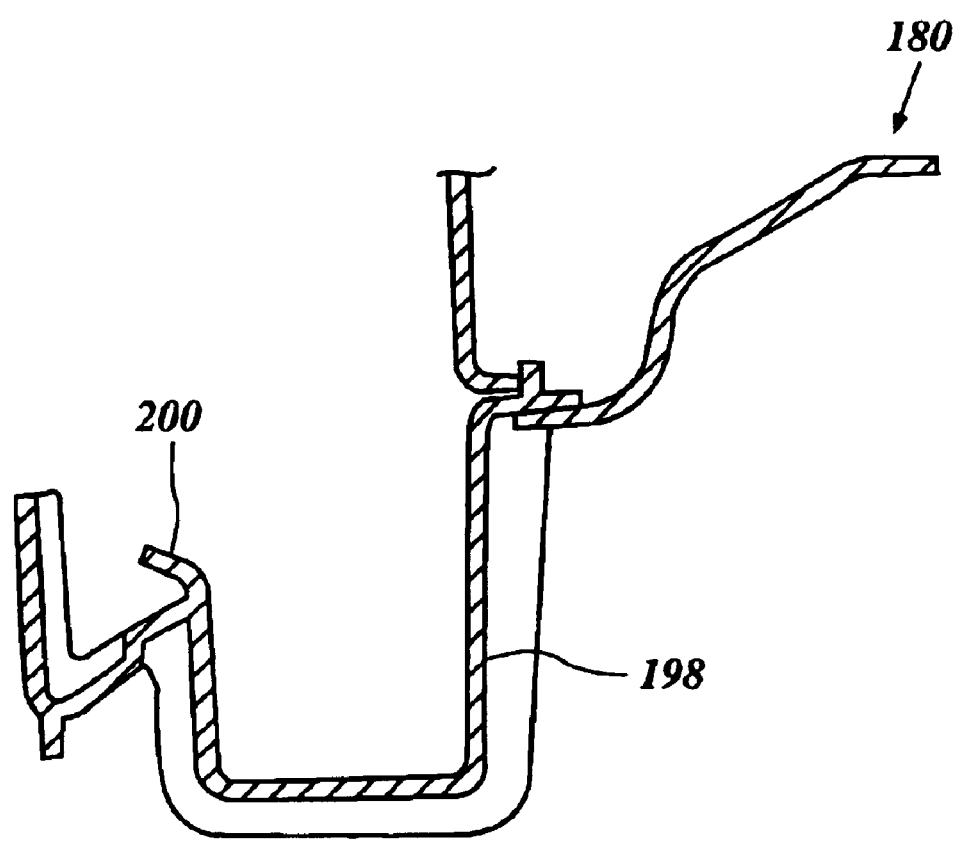

With continued reference to FIGS. 4 and 8, a coupler housing 198 can be disposed proximate the rear of the wiring recess 194. The outer edge of the illustrated coupler housing 198 can be formed with a hooked portion 200. Thus, a band (not shown) can be secured on the hooked portion 200 such that an electrical coupling member can be held in position within the coupler housing 198.

With reference again to FIGS. 1 and 2, the illustrated CVT 122 comprises a drive pulley 202, a driven pulley 204 and a drive belt 206 that extends between the drive pulley 202 and the driven pulley 204. In the illustrated arrangement, the drive pulley 202 is mounted to the right end of the crankshaft 124. The drive pulley 202 also is positioned within a belt case 210, which preferably is in communication with the crankcase 128 of the engine 120. The driven pulley 204 preferably is mounted to an output shaft 212, which is disposed within a rearward portion of the belt case 210. The output shaft 212 preferably extends generally parallel to the crankshaft 124. The drive belt 206 can be of any suitable construction and, in one arrangement, comprises a rubberized V-belt. Because the drive belt 206 is positioned about the pulleys 202, 204, which are positioned within the belt case 210, the drive belt 206 also is positioned within the belt case 210, which at least partially defines a drive belt chamber.

Viewed from a plane of the belt case 210, in a section facing a brake pedal 212 (see FIG. 2), a recess 214 that is formed in the belt case 210 extends inward toward an imaginary longitudinal center plane of the vehicle 40. The recess 214 increases foot room for an operator in an area proximate the footboards 84. Thus, the recess 214 helps reduce the likelihood that a rider's foot will contact the belt case 210 during braking operations, which include using the foot brake pedal 212.

A drain cap (not shown) also can be removably attached to the belt case 210. The drain cap can close an aperture that allows an operator to discharge water or the like that may have entered the belt chamber. Preferably, the drain cap can be placed in an easily accessible location. For instance, the drain cap can be placed on a relatively flat portion of the belt case 210, which portion is outwardly facing. In addition, the drain cap preferably is placed in a low position relative to the belt chamber such that the belt chamber can be adequately drained when the drain cap is removed.

With reference again to FIG. 2, the output shaft 212 of the CVT 122 is connected to a front drive shaft 220 and a rear drive shaft 222, which generally extend longitudinally. The CVT is connected to the drive shafts 220, 222 with a power transmission system 224. The driving force of the engine 120 is transmitted to the wheels 60, 62 via the drive shafts 220, 222. In one presently preferred arrangement, the power transmission system 224 comprises 2WD or 4WD switching mechanism. The switching mechanism (not shown) preferably is operable simply within a single touch of a switch button (not shown), which can be mounted conveniently close to the operator.

The rear drive shaft 222 is connected to the axles 228 of the right and left rear wheels 62 via a bevel gear mechanism 230. Although it is not shown, the front drive shaft 220 also can be connected to the front wheels 60 with a similar bevel gear mechanism. With reference now to FIG. 9, the bevel gear mechanism 230 comprises a pinion gear 232 and a driven bevel gear 234. The pinion gear 232 is mounted for rotation within a bearing 236, which is placed within a groove formed in a lid 238 of a gear case 240. The driven bevel gear 234 also is mounted for rotation within a bearing 242, which is secured within a second lid 244. Both of these gears 232, 234 also are supported by respective needle bearings 246, 248.

With reference now to FIG. 9, the rear drive shaft 222 terminates just forward of the gear case 240. The rear drive shaft 222 has a distal or rear portion 250 that comprises splines or other suitable keyways formed about its circumference. A collar 252 that features both an internally splined surface and an externally splined surface is fixed for rotation along the rear portion 250 of the rear drive shaft 222. The splines can be any suitable keyway or the like that allows two rotary members to be coupled for rotation. Preferably, the interlocking structure also allows relative axial movement between the members once the members are joined together. The illustrated collar 252 is secured in position along the distal portion of the rear drive shaft 222 with a pair of snap rings or the like.

A drive sleeve 254 extends over the collar 252 and the rear portion 250 of the rear drive shaft 222. The drive sleeve 254 preferably contains a structure the interlocks with the outer surface of the collar 252. For instance, in the illustrated arrangement, the drive sleeve 254 comprises an internally splined surface that interlocks with external splines on the collar 252. In this manner, the drive sleeve 254 is connected to the drive shaft 222 through the intermediate collar 252. In one arrangement, the drive sleeve 254 can be directly connected to the drive shaft 222 without an intervening member; however, the collar 252 facilitates assembly of the illustrated components due to the relative diameters reflected by each of the illustrated components.

The drive sleeve 254 comprises a number of mounting lugs 256 (one shown) that extend radially outward from a cylindrical portion of the drive sleeve 254. The lugs 256 receive fasteners 260, such as bolts, threaded fasteners or the like. The fasteners 260 attach a brake disc 262 to the drive sleeve 254. In addition, a brake caliper 264 is attached to the lid 238 with a threaded fastener 100. Other methods of attaching the brake caliper 98 to the lid 238 also can be used.

The drive sleeve 254 extends through an opening in the lid 238. A seal 266 is provided between the drive sleeve 254 and the opening in the lid 238. The bearing 236, preferably a ball bearing, journals a shaft portion 270 of the pinion gear 232. The shaft portion 270 is secured to the drive sleeve 254. The shaft portion 270 preferably is connected to the drive sleeve 254 in a manner that locks the two components together for rotation. In addition, as shown in FIG. 9, the shaft portion 270 can be secured within the drive sleeve 254 against axial movement away from the rear drive shaft 222 using a nut and washer combination 272 although other arrangements also can be used. In the illustrated arrangement, the bearing 236 is sandwiched between a step formed on the shaft portion 270 and the end of the drive sleeve 254.

The pinion gear 232 meshes with the ring gear 234. The meshing of the pinion gear 232 and the ring gear 234 is accompanied by a slight amount of backlash. Adjusting the degree of backlash in the system can be accomplished by adjusting the mating positions of the pinion gear 232 and the ring gear 234, thus achieving proper meshing and improved performance.

The illustrated construction fixes the position of the pinion gear 232 relative to the lid 238. Thus, by placing one or more appropriately sized shims 276 between the main case 274 and the lid 238, the position of the pinion gear 232 relative to the ring gear 234 can be more easily controlled. During assembly, the placement of the pinion gear 232 relative to the ring gear 234 can be incrementally adjusted by altering the shim size or the number of shims used. Thus, the pinion gear 232 can be moved axially away from the circumference of the ring gear 234 by inserting more shims or by inserting larger shims and the pinion gear 232 can be moved axially toward the circumference of the ring gear 234 by removing shims or by inserting smaller shims.

Furthermore, in the illustrated construction, at least the following components can be moved relative to the ring gear 234 as a single unit: the pinion gear 232, including the shaft portion 270, the bearing 236, the drive sleeve 254, the lid 238 and the brake components. Thus, the housing 274 can be thought of as having two portions that are adjustable relative to each other in an axial direction of the drive shaft 222. These two portions respectively comprise the pinion gear 232 and the ring gear 234.

The ring gear 234 is mounted to a coupling member 280. The coupling member 280 joins the ring gear 234 and two axle sleeves 282. The two axle sleeves 282 preferably are fixed for rotation with the coupling member 280. In the illustrated arrangement, the three components are fixed with the use of splines. Keyways or the like also can be used to secure the three components for rotation. Moreover, suitable seals 284 are used to seal gap between the rotating sleeves 282 and the stationary lid 244 and the stationary main case 274, respectively.

A half shaft 286 is provided to transfer power from the rotating sleeves 282 to the rear wheels 62. The half shafts 286 mate to the sleeves 282 with constant velocity (CV) joints 288 in the illustrated arrangement. Other suitable arrangements also can be used. In one arrangement, the CV joints and the bevel gear, can be constructed similar to the manner disclosed in U.S. Pat. No. 6,250,415, issued on Jun. 26, 2001 and hereby incorporated by reference in its entirety. Such a construction can decrease the lateral dimension of the coupling between the half shafts and the drive shafts while increasing the length of the half shafts to provide more suspension travel.

With reference now to FIGS. 10 and 11, the rear wheel suspension 72 preferably comprises a linkage 300 for independently supporting each of right and left rear wheels 62. The rear suspension 72 enables the rear wheels 62 to be controlled while they swing upward and downward. Preferably, shock absorbers 302 are disposed between the linkage 230 and the vehicle body frame 42. The upper end of the shock absorber 302 is connected to a cross pipe 304 that extends laterally between the right and left intermediate pipe 102. Preferably, the upper end of the shock absorber 302 is pivotally mounted to the cross pipe 304. The lower end of each of the shock absorbers 302 preferably is pivotally connected to a lower link member 306, which will be discussed in more detail below.

The linkage 300 preferably comprises a support structure that allows pivotal movement of an upper link member 308. The illustrated upper link member 308 is generally U-shaped in the plan view. A set of mounting members 310 can be used to join the upper link member 310 with respective brackets 312. The brackets can be supported by the suspension pipe 110.

The linkage 300 also preferably comprises a support structure that allows pivotal movement of the lower link member 306. In the illustrated arrangement, the lower link member 306 is generally U-shaped and is connected to the lower pipe 98 with a set of mounting members 314 that connect to respective brackets 316.

With continued reference to FIG. 10, a wheel support or hub 320 is supported by the upper link member 310 and the lower link member 306. The rear wheels 62, in turn, are supported by the hub 320 in any suitable manner. To control lateral rolling of the vehicle frame relative to the wheels 62 during cornering, a stabilizer 322 extends between the rear wheels 62.

The illustrated stabilizer 322 is a horseshoe shaped pipe in plan view such that the stabilizer 322 comprises a right and left end 324. Flanges 326 are disposed at the ends 324. In the illustrated arrangement, the flanges 326 are formed by flattening the ends 324 of the stabilizer 322. The right and left flanges 326 can be connected to the right and left lower link members 306. A central portion 330 of the stabilizer 322 preferably extends in a transverse direction at a location generally forward of the lower link members 306. The central portion 330 also is pivotally connected to the right and left lower pipes 98 with a pair of bearings 332 that are separated by the imaginary longitudinal center plane.

As mentioned above, a rear wheel brake system 340 operates to brake rotation of the rear drive shaft 222. Thus, the rear wheel brake system 340 in the illustrated arrangement is common to both the right and left rear wheels 62. This is possible in the illustrated arrangement because the left and right wheels are coupled together in the manner described above. In some arrangements, the left and right wheels may be driven through a differential. As described above, the illustrated brake system 340 comprises the disc-shaped disc rotor 262 that is bolted to the drive sleeve 254, which is connected to the rear drive shaft 222, and the brake caliper 264 that is bolted to the lid 238, which is bolted to the housing 274 of the gear case 240.

With continued reference to FIG. 9, the brake caliper 264 extends around a portion of the periphery of the brake disc 262 and can be actuated to clamp onto the brake disc 262 in any suitable manner. The illustrated brake caliper 262 preferably comprises a pair of replaceable pads 342 that are disposed for abutting contact with the flat faces of the disc rotor 264. The pads 342 preferably are actuated by a piston 344 that is positioned within a caliper case 346. More particularly, the piston 344 generally is positioned within a chamber formed by an inner wall 348 of the case 346.

The piston 344 is actuated by hydraulic pressure generated within the chamber. To control the hydraulic pressure, a hydraulic hose 350 is connected to the case 346 such that fluid pressure can be increased or decreased within the chamber by adding or removing fluid to the chamber. Generally, oil pressure is increased within the chamber when the brake pedal 37 is depressed or a hand actuator is used. Due to the increase in pressure, the piston 344 moves toward the rotor 262, which urges the pads 342 into contact with the rotor 262.

Figure 2:
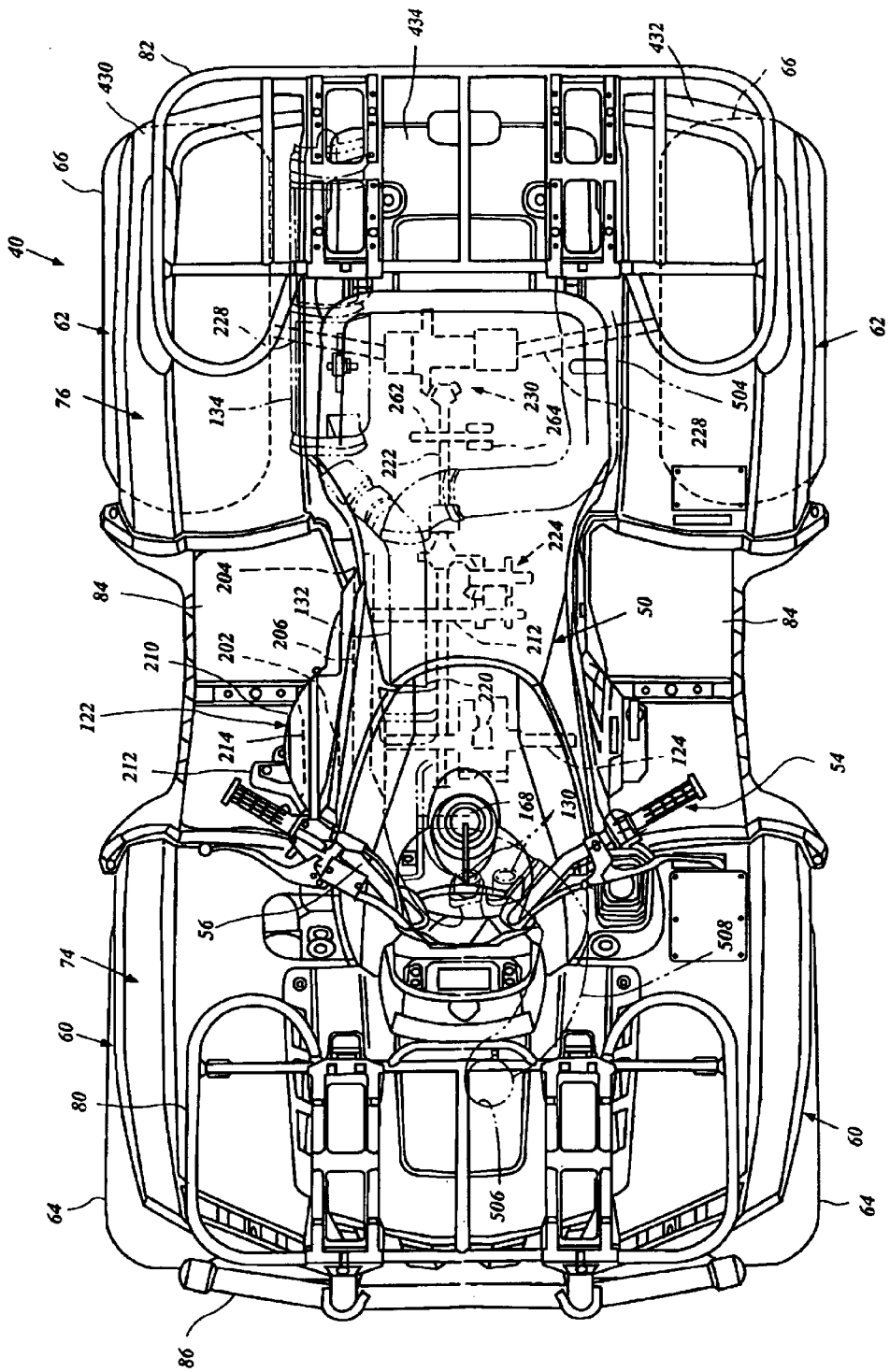
FIG. 2 is a top plan view of the vehicle of FIG. 1.

With reference to the schematic illustration in FIG. 2, the brake caliper 264 and the beveled ring gear 234 preferably are positioned on opposite sides of the rear drive shaft 222. Such a respective positioning helps in overall balancing of the vehicle due to the weight of the respective components. In addition, such positioned helps to more closely package the components because the larger components are offset from each other. If brake caliper 264 were disposed on the same side of the drive shaft 222 as the ring gear 234, the brake caliper 264 would have to be disposed outside of the gear case 240. Such a configuration would require an increased size in the gear case, which would also increase the weight of the gear case. Generally speaking, the increased weight also would not likely be centered within the vehicle, so balancing the weight distribution would be a greater concern.

Additionally, in the illustrated arrangement, as best shown in FIG. 9, at least a portion of the brake caliper 264 overlaps at least a portion of the pinion gear 232 (e.g., the shaft portion 270), which results in a shortened length of the assembly. Furthermore, when viewed from the front or rear (see FIG. 10), the linkages 300 surround the disc rotor 262 and the brake caliper 264 and the disc rotor 262 and the brake caliper 264 are positioned within an imaginary box defined by the intermediate pipes 102, the rear pipes 104, the lower pipes 98 and the suspension pipes 110. In the illustrated arrangement, the stabilizer 322 also wraps around the sides and front of the brake system 340, as shown in FIG. 11.

When the stabilizer 322 is moved upward (as shown in FIG. 11) during movement of the attached linkages 300, the stabilizer 322 still wraps around the sides and front of the brake system 340. In the illustrated arrangement, a rearward portion of the brake caliper 264 and the disc rotor 262 overlap with a forward portion of the linkage 300 (i.e., when viewed from the side—as in FIG. 11), such as the portion connected to the brackets 312, 316. Based upon this construction, at least in part, the brake caliper 264 and the rotor 262 are disposed within a highly protected region. For instance, any object that could damage the brake system would likely contact, and be repelled by, the rear suspension arrangement described above (on the sides and front) or the frame (on the bottom). In other words, when the illustrated vehicle runs over an obstacle, each of the link members 306 hit the obstacle first, so that the link members 306 protect the disc rotor 262, the brake caliper 264, or the like. Additionally, the stabilizer 322 generally surrounds the front and side surfaces of these brake components. Thus, the brake caliper 264, the disc rotor 262, or the hydraulic hose 350 are greatly protected from being easily damaged.

As illustrated, the disc rotor 262 and the brake caliper 264 generally are positioned below a lower rear side of the air cleaner 144. In addition, the placement of the illustrated brake system 340 relative to the rear drive shaft 222 results in the brake system 340 being disposed within the vertical profile of the engine unit 46 when viewed from the rear of the vehicle 40 (e.g., the disc rotor 262 and the brake caliper 264 are hidden from view from the front of the vehicle 40 by the engine unit 46). Such placement results in a substantial decrease or elimination of the cooling flow of air to the brake system 340.

With reference again to FIGS. 13 and 14, a brake cooling system 400 can be provided to supply cooling air to the disc rotor 262 and the brake caliper 264. In some arrangements, a similar cooling system can be used to supply cooling air to other components, such as shock absorbers or the like, which generate heat during movement of the vehicle. A portion of the exhaust system (i.e., the converging pipe 132) passes to the right side of the air cleaner 144 in the illustrated arrangement. Accordingly, a cooling air induction duct 402 preferably is positioned to the left side of the air cleaner 144. Because the exhaust system components (e.g., the converging pipe 132) are disposed on the right side of the air cleaner 144 (in a vehicle width direction), and because the cooling air induction duct 402 is disposed on the left side of the air cleaner 144, the air cleaner 144 is interposed between the cooling air induction duct 402 and the converging pipe 132. Thus, the air cleaner 144 can somewhat insulate the induction duct 402 from the heat of the converging pipe 132 (or other portions of the exhaust system), which generally has an elevated operating temperature. In this manner, the cooling air drawn through the duct 402 is not heated to a large extent by the heat of the exhaust system. As the result, a lower temperature cooling airflow can be supplied to the brake caliper 264 and rotor 262 and cooling efficiency can be improved.

The placement of the induction duct 402 in the illustrated arrangement also advantageously enhances the ease of maintenance of the cooling system 400. For instance, the filter element is periodically checked and replaced within the air cleaner 144. Because the cooling air induction duct 402 is positioned along a sidewall of the air cleaner 144, checking the condition of inlet 404 to the air induction duct 402 is greatly facilitated.

The cooling air induction duct 80 can be made of a resin-based material. The duct 402 preferably comprises an induction opening 404 that preferably opens in a forward direction and an exhaust opening 406 that opens in a rearward direction. In the illustrated arrangement, the induction opening 404 is larger than the exhaust opening 406 such that the velocity of the air flow can increase at the exhaust opening. Desirably, the duct 402 tapers along its length. In one arrangement, however, the duct can abruptly change shape at a location downstream of the induction opening 404. In addition, with reference to FIG. 14, the lower portion of the duct body 412 advantageously is gently bent inward toward the brake system 340. The gentle bending reduces the effect of the transition upon the airflow. Additionally, because the duct 402 is positioned on the same side of the vehicle as the components of the brake system 340 that are cooled, the length of the duct 402 can be decreased such that resistance to airflow through the duct caused by the inner surfaces of the duct can be decreased. While the illustrated exhaust opening 406 opens in a rearward direction, the opening can be designed to face in any direction so long as the air flow is directed to the brake system 340.

The illustrated duct 402 comprises a set of mounting flanges 410. Preferably, the mounting flanges 410 are formed proximate the upper and lower ends of the duct body 412. The upper mounting flange 410 preferably is secured to the upper pipe 96 with fasteners (e.g., threaded fasteners, a mechanical interlocking structure or the like) and the lower mounting flange 410 preferably is secured to the intermediate pipe 102.

With continued reference to FIG. 13, the induction opening 404 preferably extends obliquely downward and has a generally rectangular shape when viewed from the front. Other configurations are possible; however, the illustrated arrangement is preferred. Preferably, the induction opening 404 is positioned to ingest air flowing past the vehicle during operation. As such, the duct 402 can be positioned in a region of the vehicle that experiences air flow during operation. The induction opening 404 desirably is positioned proximate to or abutting on a side wall 414 of the air box 145 as well as positioned rearward of the front wall 147 of the air box 145. Such placement allows the air box 145 to function as a guide to direct air to the opening 404. In some arrangements, the outside profile of the air box can be designed to enhance this feature. Furthermore, as illustrated, a portion of the rear fender assembly 76 preferably extends to the outside of the duct body 412. Thus, an inner surface of the rear fender assembly 76 also can form a guiding passage for guiding air toward the induction opening 404. The guiding passage also can be formed, at least in part, by the passage extending through the rear fender assembly 76, in some arrangements. In other arrangements, openings formed in side panels that extend in the region of the seat and/or engine also can be used to introduce air to the air induction opening 404.

The rear fender assembly 76 preferably is made of a resin-based material. The fender assembly of the illustrated vehicle 40 will be described in further detail with reference to FIGS. 16–21. As illustrated, the fender assembly 76 generally comprises right and left fender portions 430, 432 that are positioned to generally cover at least a portion of the right and left rear wheels 62. In the illustrated arrangement, these fender portions 430, 432 are integrally formed with a central portion 434, which connects the two portions 430, 432.

Figure 19:
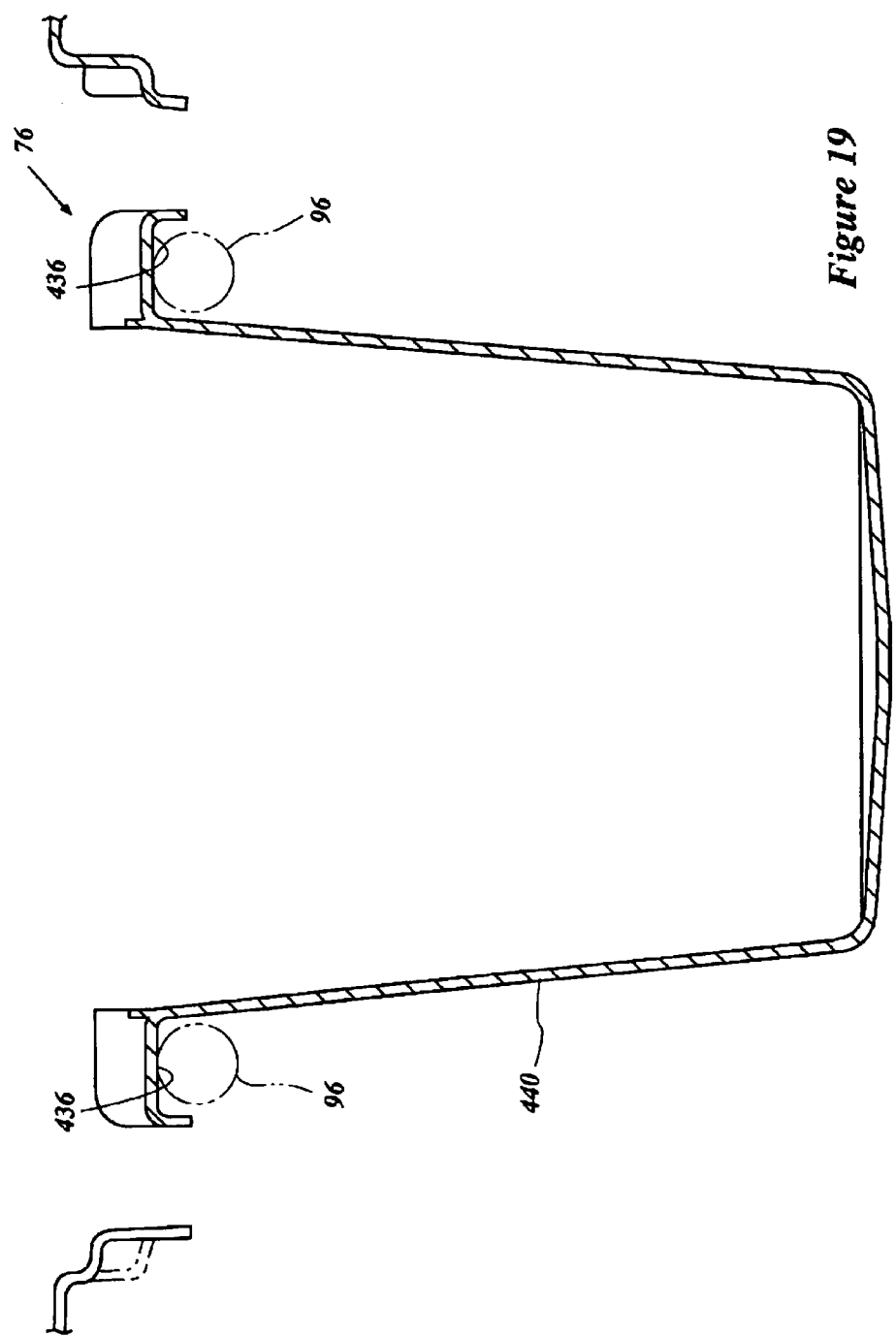
Figure 20:
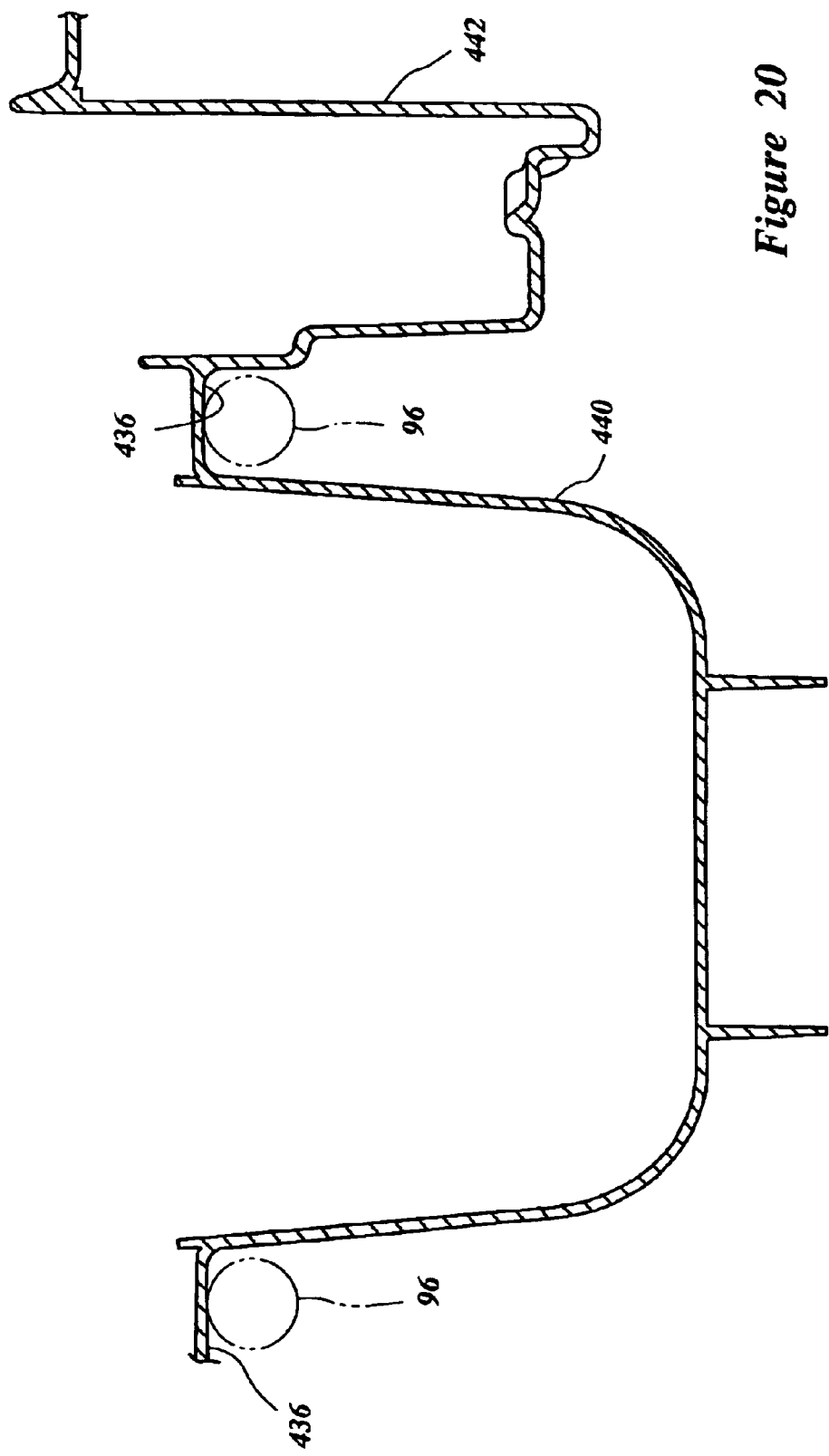
Figure 21:
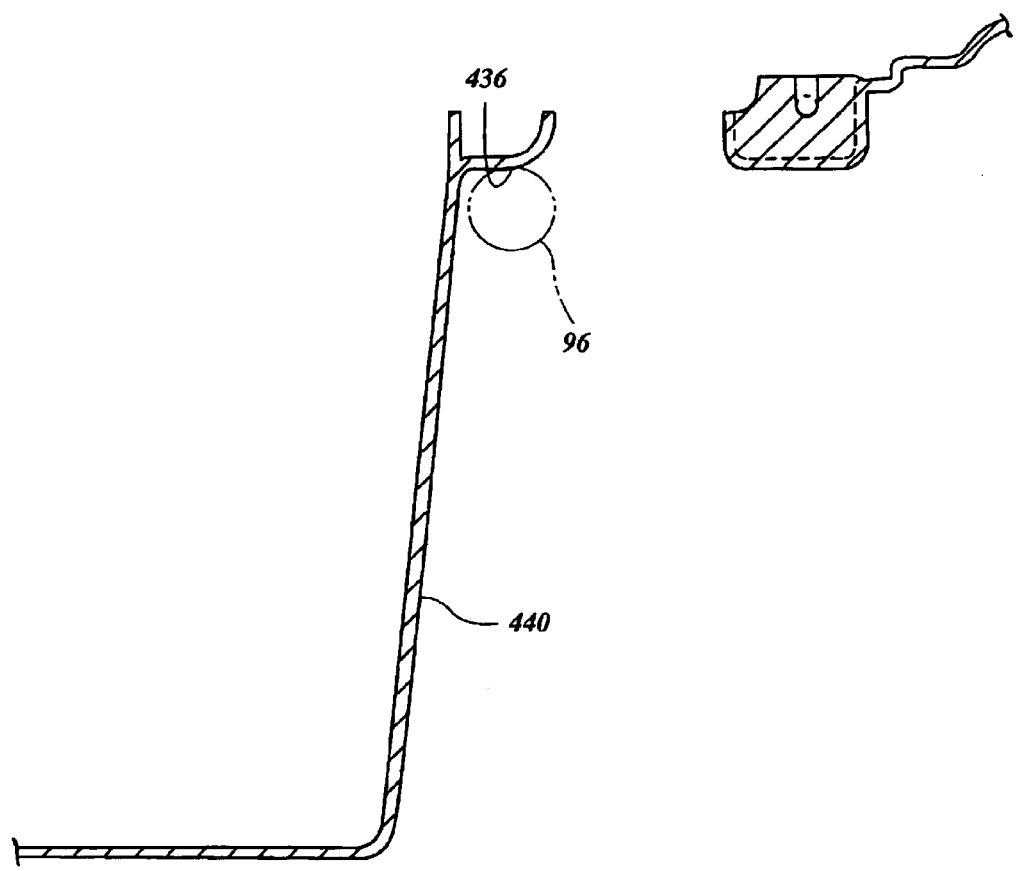

With reference to FIG. 19, supporting portions 436 are formed in the region that the right and left fender portions 430, 432 intersect with the central portion 434. The supporting portions 436 advantageously are sized and configured to receive the upper pipes 96. In this manner, the vehicle body frame 42 supports the rear fender assembly 76. The rear fender assembly can be secured thereto in any suitable manner, including the use of mechanically interlocking structures, threaded fasteners or the like.

With continued reference to FIG. 19, a storage box 440 preferably is integrally formed with the rear fender assembly 76. While integrally forming the storage box 440 leads to certain advantages, it is possible to form the storage box 440 separate of the rear fender assembly 76 and mounting the storage box 440 to the rear fender assembly 76. In the illustrated arrangement, the storage box 440 is recessed within the central portion 434 of the rear fender assembly 76. Moreover, in the illustrated arrangement, a number of auxiliary boxes 442 also are recessed into the rear fender assembly. These auxiliary boxes 442 of the illustrated arrangement function as electrical boxes and store components such as a battery 444 and various other electrical components 446.

Advantageously, to maximize available storage capacity, the illustrated storage box 440 can be formed such that the bottom wall 450 (see FIG. 17) is positioned proximate an upper portion of the disc rotor 262. Because the brake caliper 264 is disposed to one side of the disc rotor 262 rather than being disposed along the top of the disc rotor 262, the depth, and therefore the cubic volume, of the storage box 440 can be greatly increased.

Figure 17:
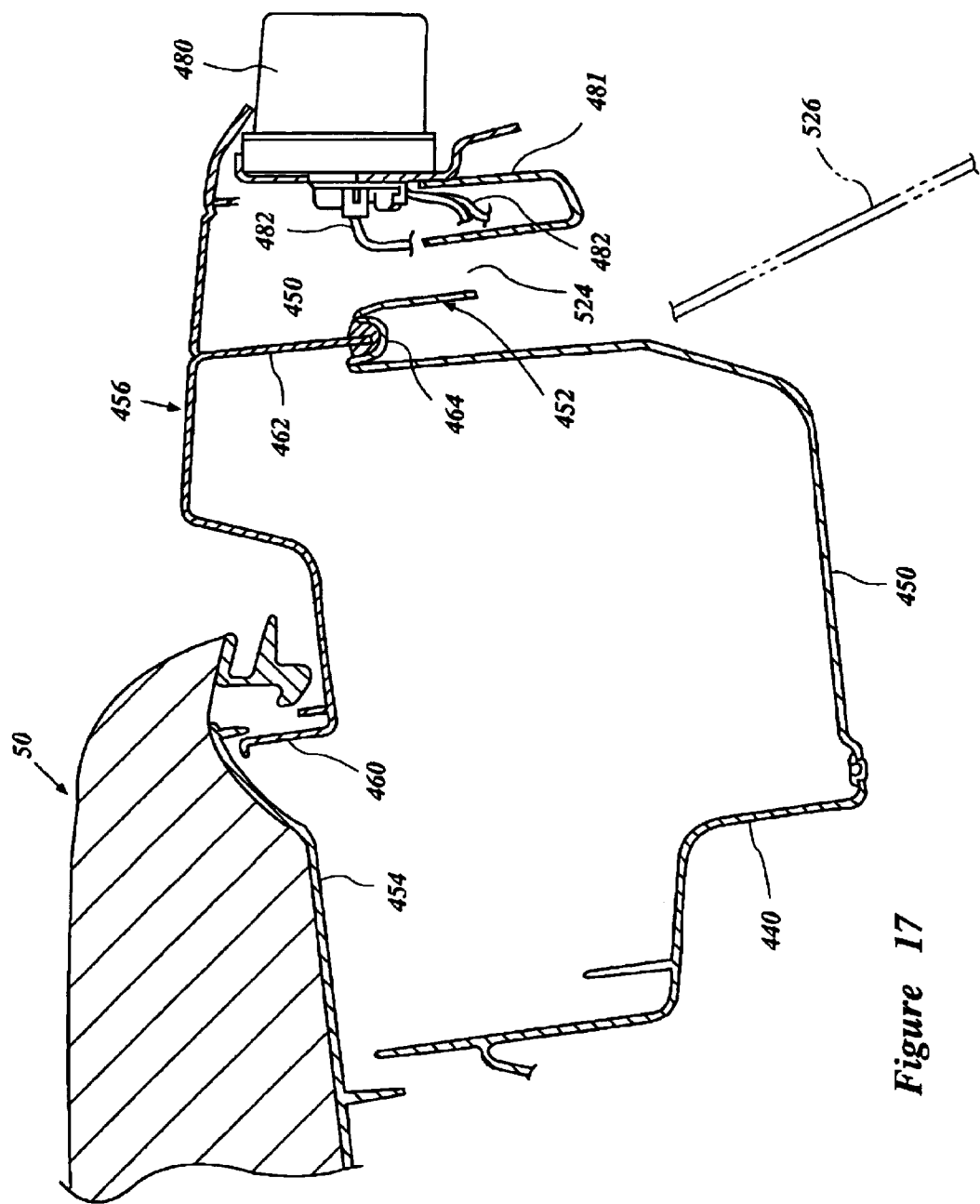

With reference now to FIG. 17, an exhaust chamber 450 also can be formed within the rear fender assembly 76. In the illustrated arrangement, the exhaust chamber 450 can be separated with partitions 452 that may be formed on the right and left sides to the rear of the storing box 440. Because the exhaust chamber 450 is formed, at least in part, by the partitions 452, and because the exhaust chamber 450 is positioned generally rearward of the seat 50, the exhaust chamber 450 is somewhat insulated from the seat 50 by the storage box 440. Accordingly, such a construction generally decreases the heat that is conducted from the exhaust chamber 450 to the operator through the seat 50.

In the illustrated arrangement, the upper ends of the storage box 440, each of the auxiliary boxes 442 and the exhaust chamber 450 are opened. Preferably, at least a portion of these upper ends can be closed with a base plate 454 of the seat 50. More preferably, the rear portion of the storage box 440 and the exhaust chamber 450 can be enclosed by a separate lid 456 while the forward portion of the storage box 440 and the auxiliary boxes 442 can be closed by the base plate 454 of the seat 50. Thus, the lid 456 can be removable such that access to the storage box 440 can be obtained without removing the seat 50. In one arrangement, a separate lid can be provided for the exhaust chamber 450 and the storage box 440. The illustrated arrangement, however, advantageously decreases the number of components that need to be manufactured and installed.

Preferably, the lid 456 is made of a resin-based material and incorporates an upstanding front rib 460. In one preferred arrangement, the front rib 460 abuts a seal member (not shown) that is positioned between the rib 460 and the corresponding portion of the seat base plate 454. In this manner, the lid 456 and the base plate 454 can be sealed together when installed on the vehicle 40.

An intermediate rib 462 preferably is positioned between the storage box 440 and the partition 452 that extends between the storage box 440 and the exhaust chamber 450. More preferably, the intermediate rib 462 is positioned over a transition wall 464 that extends between the storage box 440 and the exhaust chamber 450. Thus, the generally downwardly extending intermediate rib 462 can abut a sealing member 466 that is positioned on the transition wall 464. It is anticipated that an upwardly extending member also can be used to seal against a bottom of the lid 456. Any other suitable sealing arrangement also can be used. Advantageously, by sealing the lid 456 over the recesses formed in the rear fender assembly 76, the storage box 440, each of the auxiliary boxes 442, and the exhaust chamber 450 can be sealed in an air tight manner such that liquids, dirt, dust and the like are generally precluded from entering.

In some arrangements, the seal may not be completely air tight but may allow some movement of air into or out of the boxes or chambers even with the lid attached.

With reference to FIG. 16, a tail lamp unit 480 is installed on a rear portion of the vehicle 40. Preferably, the unit 480 is positioned approximately in the center of the vehicle width. More preferably, the unit 480 is disposed proximate the partition 452. Even more preferably, the tail lamp unit 480 is disposed within a rear wall 481 of the rear fender assembly 76. A lead wire 482 that is connected to the unit 480 can be positioned at least partially within the exhaust chamber 450. The illustrated lead wire 482 then is connected to an electrical component 446 84 in one of the auxiliary boxes 442. Because the exhaust chamber 450 is used to hold the lead wire 482, a conventional clamp is not required to secure the wire in position. Accordingly, the illustrated arrangement does not require a special placement of the lead wire 482 and reduces the number of components that need to be used or built into the rear fender assembly 76.

With reference again to FIGS. 1 though 3, a drive belt cooling arrangement 500 is provided in the illustrated arrangement. The cooling arrangement 500 preferably is arranged and configured to supply cooling air to the CVT belt chamber, which is at least partially defined by the belt case 210.

In the illustrated arrangement, an air inlet duct 502 preferably is positioned forward of the engine unit 46 and an air exhaust duct 504 preferably is positioned rearward of the engine unit 46.

The inlet duct 502 in the illustrated arrangement comprises an inlet opening 506 and a main body portion 508 that extends in a generally vertical direction from the inlet opening 506. The main body portion 508 also extends rearward and communicates with a cooling air supply portion 510, which is formed in the engine unit 46. In one arrangement, the portion 510 is formed in a forwardly facing surface of the belt case 210.

The main body portion 508 advantageously curves around one side (e.g., the left side) of the steering shaft 58. Such a configuration shortens the air flow path while allowing for a compact construction. The inlet opening 506 desirably is positioned proximate a lower portion of the front fender assembly 74. Preferably, the inlet opening is proximate the imaginary longitudinally extending generally vertical center plane. In one arrangement, the inlet opening 506 mates to a fitting formed on the fender assembly such that air is drawn from above the front fender assembly 74 into the duct 502. Such a configuration advantageously reduces the amount of water than can be ingested into the CVT.

The exhaust duct 504 comprises an inlet opening 516 that communicates with an air outlet (not shown) of the belt case 210. The duct 504 also comprises a main body 518 that, in the illustrated arrangement, extends rearward in a generally longitudinal direction from the inlet opening 516. Furthermore, the duct 504 comprises an exhaust outlet 520, which is at the distal end of the duct 504. The main body 518 can be slightly bent upward from the inlet opening 516 to the left side in the vehicle width direction. As the main body extends rearward in the illustrated arrangement, the main body 518 increasingly bends to the left side of the vehicle. Proximate the outlet 520, the main body 518 bends upward while still extending generally rearward.

Figure 18:
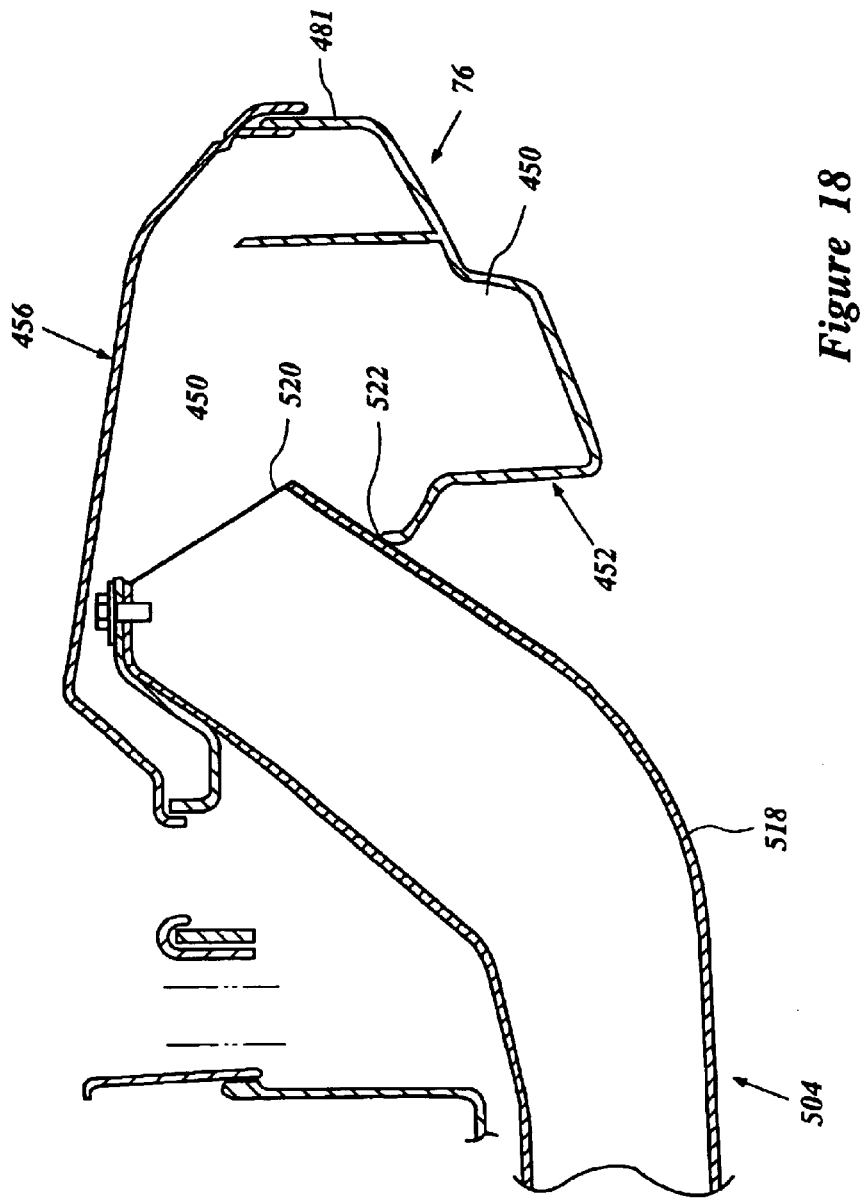

The outlet 520 of the duct 504 preferably is in communication with the exhaust chamber 450, as illustrated in FIG. 18. In one presently preferred arrangement, an opening 522 is formed in the partition 452 such that the rear end of the duct 504 can extend through the opening 522. As is shown, the exhaust chamber 450 also preferably comprises an outlet 524 such that the air can be exhaust to the atmosphere from the exhaust chamber 450.

A license plate mounting board 526 can be positioned between the outlet 524 and the rear wheel 62. Thus, the license plate mounting board 526 preferably is disposed generally below the outlet 524. Therefore, muddy water splashed by the rear wheel 62 or the like is generally prevented from being thrown upward directly into the exhaust chamber 450.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An all terrain vehicle comprising a frame assembly, an engine mounted to said frame assembly, said engine comprising a combustion chamber, an intake system and an exhaust system communicating with said combustion chamber, said intake system comprising an air cleaner, said air cleaner being generally centrally disposed relative to a width of said vehicle, said vehicle also comprising a brake system, said brake system being positioned generally rearward of said engine and said air cleaner, said brake system comprising a brake disc and a brake caliper, said exhaust system extending to a first lateral side of said air cleaner, a cooling duct inlet being disposed to a second lateral side of said air cleaner, said inlet forming an opening in a forward end of a cooling duct and said inlet defining a structure that is generally open in a forward direction, said cooling duct also comprising an outlet that is generally open toward an object to be cooled by flowing through said cooling duct, said object comprising said brake disc and said caliper to be cooled by air flowing through said cooling cooling duct.

2. The vehicle of claim 1, wherein said air cleaner comprises a forward wall and a sidewall, said inlet being positioned adjacent said side wall of said air cleaner at a location generally rearward of said forward wall.

3. The vehicle of claim 1, wherein said brake caliper and said inlet are disposed to a single side of a generally vertically extending longitudinal center plane.

4. The vehicle of claim 1, wherein a first generally vertical plane extends along one lateral side of said engine and a second generally vertical plane extends along another lateral side of said engine, said brake disc and said brake caliper being disposed between said first and second planes.

5. The vehicle of claim 1 further comprising a rear fender assembly, an inner surface of said rear fender assembly extending along at least a portion of said inlet.

6. The vehicle of claim 5, wherein said inlet is disposed between said inner surface of said rear fender assembly and said air cleaner.

7. The vehicle of claim 1, wherein said duct tapers along its length from said inlet to said outlet.

8. The vehicle of claim 1, wherein said duct gently bends inward from said inlet to said outlet.

9. The vehicle of claim 8, wherein said outlet is rearwardly facing.

10. The all terrain vehicle of claim 1, wherein said inlet is positioned rearward of a crankshaft of said engine.

11. An all terrain vehicle comprising a frame assembly, an engine mounted to said frame assembly, said frame assembly being supported by a pair of rear wheels, said rear wheels being driven by said engine through a shaft drive assembly, a brake assembly coupled to said shaft drive assembly, said brake assembly comprising a brake disc that is coupled to a drive shaft of said shaft drive assembly and a brake caliper, said engine comprising a combustion chamber, an intake system and an exhaust system communicating with said combustion chamber, said intake system comprising an air cleaner, said air cleaner being generally centrally disposed relative to a width of said vehicle, said exhaust system extending to a first lateral side of said air cleaner, a cooling duct inlet being disposed to a second lateral side of said air cleaner, said inlet forming an opening in a forward end of a cooling duct and said inlet defining a structure that is generally open in a forward direction, said cooling duct also comprising an outlet that is generally open toward said brake assembly.

12. The vehicle of claim 11, wherein said air cleaner comprises a forward wall and a sidewall, said inlet being positioned adjacent said side wall of said air cleaner at a location generally rearward of said forward wall.

13. The vehicle of claim 11, wherein said brake caliper and said inlet are disposed to a single side of a generally vertically extending longitudinal center plane.

14. The vehicle of claim 11, wherein a first generally vertical plane extends along one lateral side of said engine and a second generally vertical plane extends along another lateral side of said engine, said brake disc and said brake caliper being disposed between said first and second planes.

15. The vehicle of claim 11 further comprising a rear fender assembly, an inner surface of said rear fender assembly extending along at least a portion of said inlet.

16. The vehicle of claim 15, wherein said inlet is disposed between said inner surface of said rear fender assembly and said air cleaner.

17. The vehicle of claim 11, wherein said duct tapers along its length from said inlet to said outlet.

18. The vehicle of claim 11, wherein said duct gently bends inward from said inlet to said outlet.

19. The vehicle of claim 11, wherein said outlet is rearwardly facing.

20. The all terrain vehicle of claim 11, wherein said inlet is positioned rearward of a crankshaft of said engine.

21. An all terrain vehicle comprising a frame assembly, the frame assembly being supported by a pair of rear wheels, an engine mounted to said frame assembly, said engine driving said rear wheels through a shaft drive assembly, a brake assembly being coupled to said shaft drive assembly, said engine comprising a combustion chamber, an intake system and an exhaust system communicating with said combustion chamber, said exhaust system comprising an exhaust pipe, a cooling system being provided to direct cooling air how to said brake assembly, said cooling system comprising a cooling air duct, said duct comprising an inlet that is disposed generally higher than said engine, and said vehicle further comprising means for insulating said inlet from said exhaust pipe.

22. The all terrain vehicle of claim 21, wherein said inlet is positioned rearward of a crankshaft of said engine.

23. An all terrain vehicle comprising a frame assembly, a seat being supported by said frame assembly, said frame assembly being supported by a pair of rear wheels, an engine mounted to said frame assembly, said engine driving said rear wheels through a belt transmission an a shaft final drive assembly, said belt transmission being disposed within a transmission housing, a brake assembly comprising a rotor that is coupled to said shaft drive assembly and that is positioned rearward of said transmission housing, said engine comprising a combustion chamber, an intake system and an exhaust system communicating with said combustion chamber, said intake system comprising an air cleaner, said air cleaner being disposed between said transmission housing and said seat, said exhaust system comprising an exhaust pipe, a cooling system being provided to direct cooling air flow to said brake assembly, said cooling system comprising a cooling air duct, said duct comprising an inlet that is disposed generally above said engine and to one lateral side of said air cleaner with said exhaust pipe extending to another lateral side of said air cleaner.

24. The all terrain vehicle of claim 23, wherein said inlet is positioned rearward of a crankshaft of said engine.

25. An all terrain vehicle comprising a frame assembly, a seat being supported by said frame assembly, said frame assembly being supported by a pair of rear wheels, an engine mounted to said frame assembly, said engine driving said rear wheels through a belt transmission and a shaft final drive assembly, said belt transmission being disposed within a transmission housing, a brake assembly being coupled to said shaft drive assembly, said brake assembly comprising a rotor, said engine comprising a combustion chamber, an intake system and an exhaust system communicating with said combustion chamber, said intake system comprising an air cleaner and an air delivery duct, said air cleaner being disposed forward end upward relative said brake rotor, said air delivery duct extending forwardly from said air cleaner toward said combustion chamber at a location generally above said transmission housing, said exhaust system comprising an exhaust pipe, a cooling system being provided to direct cooling air flow to said brake assembly, said cooling system comprising a cooling air duct, said duct having an inlet that is disposed generally over said transmission housing and said duct having an outlet that is disposed rearward of said transmission housing and forward of said rotor, said outlet being opened toward said rotor.

26. The all terrain vehicle of claim 25, wherein said frame assembly comprises two upper pipes that are laterally spaced from each other, said seat being mounted to said upper pipes and said air cleaner is positioned between said upper pipes, an upper end of said duct being attached to one of said two upper pipes.

27. The all terrain vehicle of claim 25, wherein said inlet of said duct opens generally obliquely downward.

28. The all terrain vehicle of claim 25, wherein said inlet is positioned rearward of a crankshaft of said engine.

* * * * *

UNITED STATES PATENT AND TRADEMARK OFFICE
CERTIFICATE OF CORRECTION

PATENT NO. : 6,920,949 B2  Page 1 of 1
APPLICATION NO. : 10/217200
DATED : July 26, 2005
INVENTOR(S) : Matsuura et al.

It is certified that error appears in the above-identified patent and that said Letters Patent is hereby corrected as shown below:

Column 1,
Line 46, delete "Such" and insert -- such --.

Column 16,
Line 39, after "by" add -- air --.
Line 41, delete "cooling" before "duct".

Column 17,
Line 55, delete "how" and insert -- flow --.

Column 18,
Line 7, delete "an" and insert -- and --.
Line 37, delete "end" and insert -- and --.
Line 37, after "relative" insert -- to --.

Signed and Sealed this

Eleventh Day of July, 2006

JON W. DUDAS
*Director of the United States Patent and Trademark Office*